US011474857B1
US 11,474,857 B1
Oct. 18, 2022

(12) United States Patent
Biemueller et al.

(54) ACCELERATED MIGRATION OF COMPUTE INSTANCES USING OFFLOAD CARDS

(71) Applicant: Amazon Technologies, Inc., Seattle, WA (US)

(72) Inventors: Sebastian Biemueller, Dresden (DE); Uwe Dannowski, Moritzburg (DE); Filippo Sironi, Dresden (DE); Barak Nirenberg, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 16/868,479

(22) Filed: May 6, 2020

(51) Int. Cl.
*H04L 45/30* (2022.01)
*G06F 9/48* (2006.01)
*G06F 9/455* (2018.01)
*G06F 9/50* (2006.01)
*G06F 12/109* (2016.01)
*G06F 13/38* (2006.01)
*G06F 13/28* (2006.01)

(52) U.S. Cl.
CPC ........ *G06F 9/4856* (2013.01); *G06F 9/45558* (2013.01); *G06F 9/5077* (2013.01); *G06F 12/109* (2013.01); *G06F 13/28* (2013.01); *G06F 13/385* (2013.01); *G06F 2009/4557* (2013.01); *G06F 2009/45579* (2013.01); *G06F 2009/45595* (2013.01)

(58) Field of Classification Search
CPC ....................................................... H04L 45/30
USPC .............................................................. 718/1
See application file for complete search history.

(56) References Cited

U.S. PATENT DOCUMENTS

| 8,880,773 | B2 | 11/2014 | Costa |
| 8,949,431 | B2 | 2/2015 | Bercovici et al. |
| 9,197,489 | B1* | 11/2015 | Vincent ................. H04L 67/148 |
| 9,323,554 | B2 | 4/2016 | Zhang et al. |
| 9,361,145 | B1 | 7/2016 | Wilson et al. |
| 9,432,304 | B2 | 8/2016 | Johnsen et al. |
| 9,880,870 | B1 | 1/2018 | Danilov et al. |
| 10,198,377 | B2 | 2/2019 | Wilson et al. |
| 10,334,034 | B2 | 6/2019 | Zhao |
| 2013/0086298 | A1* | 4/2013 | Alanis ................. G06F 9/45558 711/6 |
| 2013/0254766 | A1* | 9/2013 | Zuo ......................... H04L 49/70 718/1 |
| 2014/0059539 | A1* | 2/2014 | Simonsen ........... G06F 11/1484 718/1 |
| 2015/0160964 | A1* | 6/2015 | Nelson .................. G06F 3/0647 718/1 |
| 2015/0220356 | A1* | 8/2015 | Khesin .................. H04L 67/025 718/1 |

(Continued)

*Primary Examiner* — Titus Wong
(74) *Attorney, Agent, or Firm* — Robert C. Kowert; Kowert, Hood, Munyon, Rankin & Goetzel, P.C.

(57) ABSTRACT

As part of a compute instance migration, a compute instance which was executing at a first server begins execution at a second server before at least some state information of the compute instance has reached the second server. In response to a determination that a particular page of state information is not present at the second server, a migration manager running at one or more offload cards of the second server causes the particular page to be transferred to the second server via a network channel set up between the offload cards of both servers, and stores the page into main memory of the second server.

20 Claims, 10 Drawing Sheets

(56) References Cited

U.S. PATENT DOCUMENTS

2015/0378767 A1 12/2015 Tarasuk-Levin et al.
2015/0381589 A1 12/2015 Tarasuk-Levin et al.
2018/0074908 A1 3/2018 Tarasuk-Levin et al.

* cited by examiner

Pull-mode-only transfers for post-pause stage 950A

Pull-and-push mode transfers for post-pause stage 950B

US 11,474,857 B1

ACCELERATED MIGRATION OF COMPUTE INSTANCES USING OFFLOAD CARDS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization server to be shared among multiple users by providing each user with one or more compute instances (such as "guest" virtual machines) hosted by the single virtualization server. Each such compute instance may represent a software simulation acting as a distinct logical computing system that provides users with the illusion that they are the sole operators of a given hardware computing resource, while also providing application isolation and security among the various virtual machines. Instantiating several different compute instances on the same host may also help increase the overall hardware utilization levels at a data center, leading to higher returns on investment.

For a number of reasons such as hardware maintenance and workload balancing, a compute instance which is launched at one virtualization server may sometimes be migrated to another virtualization server. This requires state information of the compute instance to be transferred from the source virtualization server to the destination virtualization server.

Figure 1:
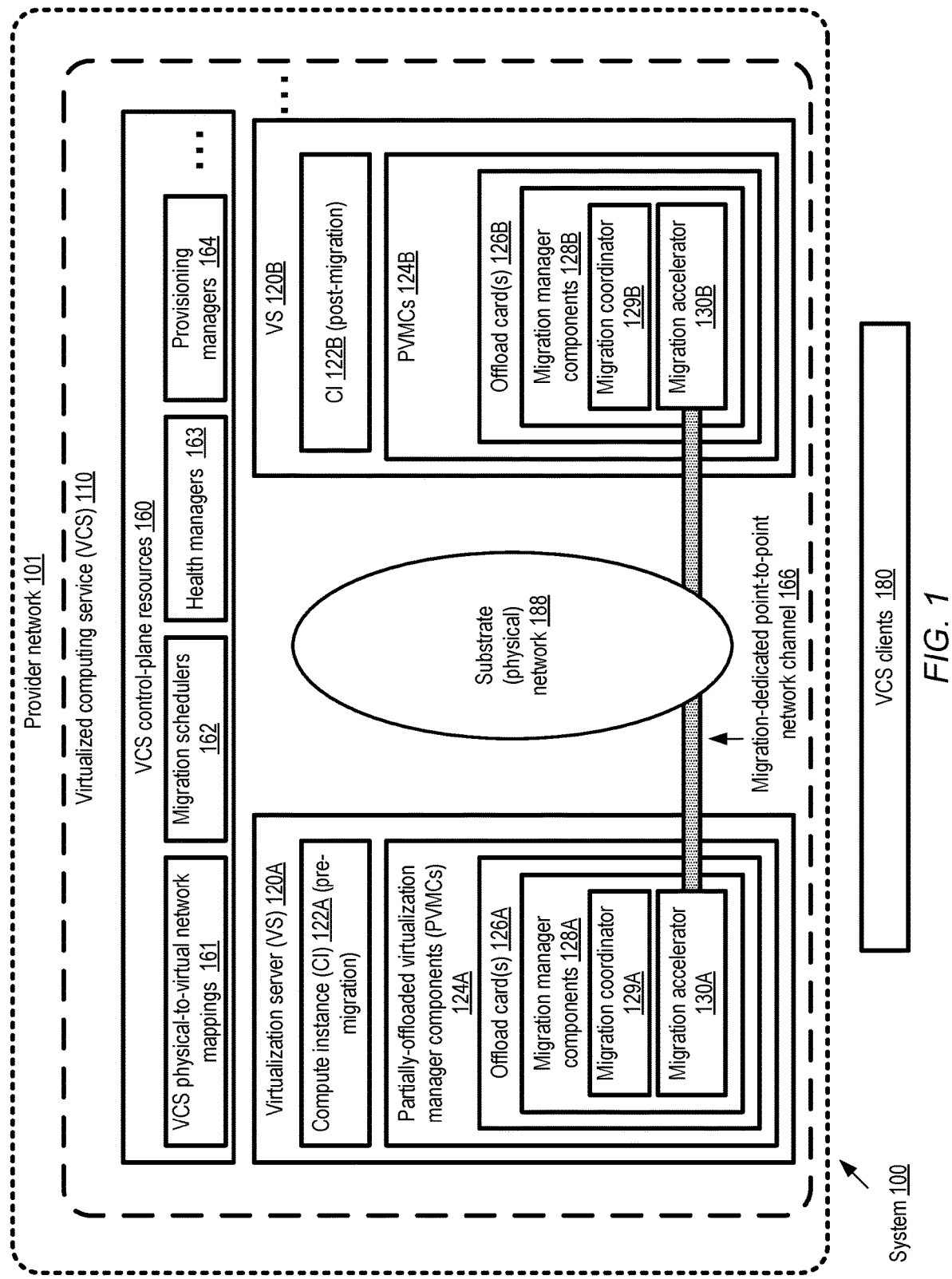
FIG. 1 illustrates an example system environment in which migration manager components running at offload cards of virtualization servers may be used to accelerate the migration of compute instances, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for accelerating the migrations of compute instances at virtualized computing services from one virtualization server to another, using offload cards to perform a substantial portion of the work required to transfer state information of the compute instance. In addition to one or more primary processors (e.g., CPUs) and a main memory, a virtualization server may comprise one or more offload cards, e.g., each comprising one or more processors (referred to as offload processors) and one or more memories. As indicated by their name, offload cards may typically be used to reduce the workload of the primary processors, e.g., by performing some aspects of virtualization management tasks (such as network virtualization and/or storage virtualization) which would otherwise have to be performed using the primary processors. Offloading such tasks has the beneficial effect of enabling more of the primary processors' computation capacity to be made available for compute instances (such as guest virtual machines) set up at the virtualization servers.

In order for a compute instance to be migrated from a source virtualization server (at which the compute instance runs prior to its migration) to a destination virtualization server, state information of the compute instance has to be transferred from the source virtualization server to the destination virtualization server. This can include both administrative state information (e.g., contents of various data structures used by operating systems etc.) as well as application-level state information stored in the memory assigned or allocated to the compute instance. To reduce the end-customer-perceived downtime of the applications being run at the compute instance, migration techniques attempt to minimize the duration for which the compute instance has to be paused during the migration. In the proposed technique, in addition to performing virtualization management tasks, firmware and/or software running at the offload cards may also perform a number of tasks of an optimized multi-stage instance migration workflow, which helps to minimize compute instance pauses and also increases the speed and efficiency of state information transfers. Such tasks performed with the help of the offload cards may include, for example, (a) setting up a network channel (dedicated for migration-related packet transfers) between the source virtualization server and the destination virtualization server, (b) accessing instance state information stored in the source virtualization server's main memory, (c) encrypting and transferring the state information via the network channel, and (d) decrypting and depositing the state information at the destination virtualization server's main memory. These tasks may be performed with relatively little assistance from the primary processors at either the source or the destination virtualization servers in various embodiments. As a result of using the dedicated network channel and the offload card's resources, the overall time taken to complete instance migration may be reduced substantially (e.g., to a few tens of milliseconds) relative to conventional approaches, which may significantly reduce the downtimes and/or slowdowns of end-user applications running on the migrated compute instance. Such instance migrations may be referred to as live migrations, in that the compute instance may appear to remain live or online from the perspective of end users throughout the migration procedure. The migration-related overhead imposed on other compute instances which may be running at either the source or the destination virtualization servers may also be reduced as a result of using the offload cards.

According to some embodiments, a respective instance migration manager may be implemented at one or more offload cards of a source virtualization server and at one or more offload cards of the destination virtualization server. A given instance migration manager in turn may comprise several sub-components and associated data structures, including a migration coordinator and a migration accelerator in some embodiments. The migration coordinator may, for example, receive commands and metadata from control plane or administrative components of a virtualized computing service of a provider network or cloud computing environment, and initiate a multi-stage migration workflow comprising a pre-pause stage, a short pause stage, and a post-pause stage for a given compute instance indicated in the commands. These three stages may also be referred to as the pre-pause phase, the pause phase, and the post-pause phase respectively. The migration coordinator may cause a network channel (e.g., a point-to-point network connection over which raw Internet Protocol (IP) packets can be sent without using transport layer protocol) to be established between the migration accelerators of the source and destination compute instances in various embodiments. This channel may be used to transfer state information of the compute instance in at least one stage of the multi-stage migration workflow in various embodiments. In the pre-pause stage, some fraction of the compute instance's state information may be transferred by the migration manager, even as the compute instance continues to run at the source compute instance (and thus continues to modify state information) in some embodiments. In the pause stage, another subset of state information may be transferred, this time while the compute instance is paused, such that at least the minimum amount of state information (such as the state of various virtual CPUs assigned to the compute instance) required to start the compute instance becomes available at the destination. In the post-pause stage, in various embodiments the compute instance may be started up at the destination virtualization server even though some of the state information it may eventually need has not yet been transferred. In some embodiments, a page-fault model may be used to initiate the transfer of such remaining state information: e.g., as and when a memory page containing yet-to-be-transferred state information is needed by the compute instance, it may be fetched via the network channel using a page fault handling protocol implemented largely at the offload cards. The fraction of the compute instance's state information which is transferred in each stage may vary from one instance to another and from one pair of source/destination virtualization servers to another.

When all the state information has been transferred, the post-pause stage may be terminated, the compute instance may resume normal operations using locally-stored state information at the destination virtualization server without requiring any additional interactions with the source virtualization server, and the network channel which was set up specifically for the migration-related traffic may be closed in various embodiments. The migration manager components at the offload cards may re-use some of the features and capabilities of the offloaded virtualization management components running at the offload cards in at least some embodiments—e.g., the functionality of performing on-the-fly encryption and decryption for DMA accesses may also be used for other purposes by the virtualization management components, and not just for migration-related work. A given migration manager may act as both a source-side migration manager and as a destination-side migration manager in at least some embodiments. For example, the migration manager at a virtualization server may participate in the multi-stage migration procedure of one compute instance when it is being migrated to the virtualization server, and the same migration manager may participate in the multi-stage migration procedure of another compute instance (or even the same compute instance) away from the virtualization server.

As one skilled in the art will appreciate in light of this disclosure, certain embodiments may be capable of achieving various advantages, including some or all of the following: (a) reducing the overall time taken to perform compute instance migrations, including the time period during which the compute instances have to be paused and are hence unavailable to response to end-user application requests, (b) reducing the impact of compute instance migrations on other compute instances which happen to be running at the source or destination virtualization servers, and (c) improving the overall user experience of customers of virtualized computing services including those whose compute instances are not necessarily migrated, by enabling workload balancing across the service's computing resources to be performed with lower impact on the customers, and by simplifying the scheduling of maintenance windows which in turn reduces the likelihood of errors and failures.

According to some embodiments, a method may comprise an instance migration manager, which is running at one or more offload processors on offload cards of a source virtualization server (SVS), obtaining an indication that a compute instance of the source virtualization server is to be migrated to a destination virtualization server (DVS). Such an indication may, for example, be obtained in a command sent from a control plane of a virtualized computing service (VCS) at which the virtualization servers are configured. The SVS and the DVS may each include at least one primary processor in addition to one or more offload processors in various embodiments. The instance migration manager running at the source virtualization server may be referred to as a source migration manager (SMM), and a corresponding instance migration manager running at offload processor(s) of the destination virtualization server may be referred to as a destination migration manager (DMM).

Using metadata provided by the control plane, a secure network channel dedicated for transferring at least some migration-related network packets may be established by the SMM and the DMM between the respective sets of offload processors or cards at the SVS and the DVS in various embodiments. The metadata may include, for example, a network address assigned to the DVS's offload cards, an indication of the networking protocol to be used to establish a connection for the channel, security artifacts such as digital certificates and/or cryptographic keys to be used to secure the channel, and so on in different embodiments.

In a pre-pause stage of a multi-stage workflow for migration of the compute instance, in various embodiments contents of a first collection of pages containing state information of the compute instance may be caused to be transferred by the SMM from the SVS's main memory to the DVS's main memory with the help of the DMM, while the compute instance remains running at the SVS. An iterative approach may be used in various embodiments, in which in each iteration, some number of pages are transferred, then any newly-dirtied or newly-written pages are identified (e.g., using one or more dirty-pages bit maps or similar data structures) for transfer in the next iteration, and so on. In some embodiments, the secure channel may be used for the pre-pause stage transfers; in other embodiments, other network connections may be used.

At some point, the pre-pause stage may be concluded in various embodiments, e.g., based on detecting that the rate at which pages are being written has reached a steady state and/or based on detecting that a time allotted (e.g., by the VCS control plane, or by the SVS migration manager itself) for the pre-pause stage has expired. The compute instance may then be paused at the SVS, and the pause stage of the migration workflow may be begun. While the compute instance is paused, additional state information may be transferred from the SVS main memory to the DVS main memory, e.g., by the SMM in collaboration with the DMM in various embodiments, such that sufficient state information quickly becomes available at the DVS to enable the compute instance to be started. In some embodiments, the secure channel may be used for the pause stage state information transfer; in other embodiments, other network connections may be used.

In various embodiments, as soon as such critical state information has become available at the DVS, the compute instance may be started up at the DVS, and the post-pause stage may be begun, even though some state information (non-critical for starting up the compute instance) remains un-transferred. To enable such un-transferred state information to be identified so that it can be requested from the SVS when needed, one or more data structures such as a present-pages bit map may be established at the DVS, e.g., before the instance is started up at the DVS. In some implementations the DMM may initialize and populate the data structures based on information sent by the SMM. A present-pages bitmap may, for example, comprise "1" bit entries for those pages which have already been transferred and are hence "present" at the DVS main memory, and "0" bit entries for those pages which have not yet been transferred. In response to a determination, made using the present-pages data structure in the post-pause stage, that contents of a particular page comprising state information required to perform one or more operations at the DVS on behalf of the compute instance have not been transferred, the DMM may send a request to the SMM for the particular page, e.g., via the network channel, and without using the DVS's primary processors. Such a request may be termed a migration related page fault in some embodiments. Upon receiving such a request, the DMM may access the requested page from the SVS main memory (without using the SVS primary processors), and cause the page contents to be transmitted to the SMM, e.g., via the network channel. The contents of the page may then be stored in the DVS's main memory, so that the page can be read by or on behalf of the compute instance at the DVS. Note that migration-related page faults may also be generated for device model state in various embodiments—i.e., for memory that is not directly accessible from the compute instance itself, but is used by firmware or hardware to perform operations on behalf of the compute instance.

Present-pages bit maps and/or dirty pages bit maps may indicate the authoritative ownership of the pages of memory in at least some embodiments. For example, if the present-pages bit map indicates that a particular page is present at the DVS, this implies that the compute instance running at the DVS now owns that page, whereas if a dirty-pages bit map indicates that a particular page is present at the SVS, this implies that the particular page is still owned by the compute instance running at the SVS. In at least some embodiments, these page ownership-indicating data structures may be stored and/or managed at the offload cards of the virtualization servers, without requiring participation of the primary processors (CPUs) of the virtualization servers, and thus further reducing the amount of migration-related work that has to be done by the primary processors.

As indicated above, at least some of the remaining state information, which had not been transferred to the SVS by the time that the compute instance was started up at the SVS, may be fetched on demand when required by the running compute instance at the SVS. Other state information may be transferred more proactively in some embodiments, without waiting until the running compute instance actually requires them. For example, in at least some embodiments, a sweeper component running at the DVS may be configured to examine (e.g., periodically, based on a tunable scheduling parameter) the present-pages data structure at the DVS, and generate spurious or fake page faults for pages which have yet to be transferred, even though the pages are not immediately required for the compute instance. In some embodiments, the sweeper may comprise a thread or process of the DMM; in other embodiments, the sweeper may comprise a thread or process of a virtualization management component of the DVS. The spurious page faults may be resolved in a manner similar to real migration related page faults in at least some embodiments: that is, the page indicated in the spurious page fault may be read from the SVS main memory and transferred to the DVS over the network channel set up for migration-related traffic. In some embodiments, the sweeper may prioritize some proactive page transfers over others based on a number of factors. For example, such prioritizations could be dependent on detecting the memory needs of the specific physical CPUs assigned/attached to the compute instance (e.g., the sweeper could request pages that are referenced by CPU registers such as the stack pointer register), the memory needs of the devices attached to the compute instance, in-flight I/O requests, known characteristics of the virtual machine image being used for the compute instance, and/or client-specific characteristics of the workload being executed at the compute instance. In at least one embodiment, a sweeper component may be executed at the SVS (in addition to the sweeper at the DVS). Such a source-side sweeper component may inform the DVS sweeper component regarding memory access patterns of the compute instance prior to migration, and this access pattern information may be used by the DVS sweeper to prioritize some proactive page transfers over others. Pages which are expected to be accessed sooner may be requested by the DVS sweeper before pages expected to be accessed later, for example. Because, in general, the time taken for the running compute instance to require any particular page of yet-to-be-transferred state information may be unpredictable in various embodiments, the sweeper may be useful in ensuring that all the state information which the compute instance could need gets transferred to the DVS in a timely manner in at least some embodiments. In some implementations, the requests (if any) generated by the sweeper may be fulfilled at a lower priority than the requests for pages that are required immediately for the compute instance to make progress on its operations.

In another approach towards proactive transfer of remaining state information in the post-pause stage, the SMM may initiate some transfers, without waiting for page fault-related requests to be sent from the SVS. In this approach, transfers may be initiated from either side—due to real or spurious page faults from the DVS, and/or due to pushes of remaining state information from the SVS. Protocols to handle or avoid potential duplicate transfers of pages may be implemented in such embodiments, e.g., by the SMM and the DMM. The DMM may, for example, ensure that a given page is written to the main memory at the DVS at most once.

In at least some embodiments, the SVS and the DVS may each comprise a stripped-down version of a hypervisor, running at the primary processors of the virtualization servers. Such hypervisors may be referred to as "stripped-down" because at least a portion of traditional hypervisor functions may instead be handled at the offload cards of the virtualization servers. In some embodiments, such stripped-down hypervisors may also play a role in the multi-stage migration workflows—e.g., they may be responsible for maintaining some of the data structures used, and/or for participating in a portion of the migration-related page fault protocol. Note that the offload-card based migration techniques described herein are independent of the types of hypervisors (if any) run at the primary processors of the virtualization servers involved. For example, offload cards may implement, or participate in, the migration of compute instances in some embodiments in which full-fledged (rather than stripped-down) hypervisors are used at the source virtualization servers, the destination virtualization servers, or both the source and destination virtualization servers.

In at least some embodiments, non-volatile state information of a compute instance (state information that is not expected to change after the migration workflow is started) may be transferred even before the pre-pause phase of the migration is begun. In one implementation, such non-volatile state information may be transferred via the network channel set up for migration-related traffic, as soon as the channel is established, and before other state information (which has a higher probability of being mutated) is transferred. In one embodiment, elements of such non-volatile state information may be known to the VCS control plane, and may be written to the destination virtualization server by the VCS control plane without having to be transferred from the source virtualization server. In addition to the use of the offload cards, other techniques may also be employed to further speed up compute instance migrations in some embodiments. For example, a compute instance may be notified in advance, e.g., by the VCS control plane, that it has been selected for migration. This notification may serve as a signal to the compute instance to reduce its rate of memory modification; such a reduction may in turn reduce the amount of memory whose contents have to be transferred, and thus speed up the migration.

As mentioned above, the virtualization servers at which the accelerated migration procedure discussed above is implemented may be part of a virtualized computing service of a provider network in at least some embodiments. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands.

In some embodiments, a number of isolated virtual networks may be set up on behalf of clients of a virtualized computing service (VCS) of a provider network. A VCS may also be referred to as an elastic compute service, virtual machines service, computing cloud service, compute engine, and cloud compute, in various implementations. An isolated virtual network (IVN) may comprise a collection of networked resources (including, for example, compute instances) assigned or allocated to a given client, which are logically isolated from (and by default, inaccessible from) resources allocated in other IVNs. In various embodiments, when a compute instance of an IVN is migrated using the above-described techniques, it may remain within the same IVN after the migration—that is, the (virtualized) networking configuration of the compute instance itself may not change, even though it runs at a different virtualization server with a different physical network address. Mappings between the physical network addresses (also referred to as a substrate network) and the virtual network addresses assigned to compute instance may be maintained by the control plane of the virtualized computing service. In various embodiments, at least a portion of the metadata provided to the migration managers may be based on such mappings, so that the migration-specific network channels can be set up properly.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information and the like). The data plane includes customer resources that are implemented on the cloud provider network (e.g., computing instances, containers, block storage volumes, databases, file storage and the like). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks. Control plane components may be responsible for initiating at least some migrations of compute instances in various embodiments, e.g., by sending commands and metadata to the migration managers as indicated above.

Example System Environment

FIG. 1 illustrates an example system environment in which migration manager components running at offload cards of virtualization servers may be used to accelerate the migration of compute instances, according to at least some embodiments. As shown, system 100 comprises resources of a virtualized computing service (VCS) 110 of a provider network 101. Compute instances such as guest virtual machines may be launched at virtualization servers 120 (e.g., VS 120A or VS 120B) of the VCS 110 in response to programmatic requests directed by VCS clients 180 to VCS control plane resources 160 in the depicted embodiment. For example, a compute instance (CI), referred to as pre-migration CI122A may initially be launched at VS 120A. Later, e.g., based on logic implemented at a migration scheduler 162 of the VCS control plane, a decision may be made to transfer or migrate the compute instance to a different VS 120B in the depicted embodiment. Such a decision may be made based on any of various factors in different embodiments—e.g., based on health metrics pertaining to different virtualization servers and/or different parts of the substrate (physical) network by health managers 163, based on measured resource utilization levels of the virtualization servers, and so on. In at least some embodiments, a migration scheduler may determine that a compute instance should be migrated based on a planned maintenance operation which requires the virtualization server on which the compute instance is running to be taken offline. In some cases, compute instance migrations may be initiated in response to requests from VCS clients 180, e.g., if a client requests that a given compute instance be transferred to a host from which the latencies for messages to other compute instances of the client are lower than the latencies for similar messages from the compute instance's current virtualization server.

Compute instances may be assigned respective virtual network interfaces (VNI) in some embodiments by a VCS, with one or more network addresses being assigned to a given VNI. These network addresses may, for example, be selected from a range of network addresses of an isolated virtual network (IVN) set up on behalf of the client for whom the CI is instantiated. Clients may be given substantial flexibility regarding the network addresses assigned within their IVNs—different IVNs may even use the same network addresses for respective instances if desired. Such client-selected addresses may be referred to as virtual network addresses. When a network packet has to be transmitted from a given CI to some other CI at a different virtualization server, or to some other remote resource, an encapsulation protocol may be used. According to such an encapsulation protocol, the original packet (whose source address and/or destination address is a virtual network address) is encapsulated within another packet which is transferred over a substrate or physical network 188 within which the network interface cards (NICs) of the virtualization servers are configured in at least some embodiments. The source and destination addresses of the encapsulation packet (within which the original packet is contained) are from a different range of addresses assigned to the NICs in the substrate network. As such, physical-to-virtual network mappings 161 may be maintained at the VCS control plane resources 160 in various embodiments, to enable packets to be directed/routed to the appropriate destinations. The VCS control plane may also include other resources, such as provisioning managers 164 responsible for identifying and/or configuring virtualization servers to be used for various compute instances in various embodiments. In some embodiments, a provisioning manager 164 may be responsible for selecting a destination virtualization server to which a compute instance is to be migrated.

Each of the virtualization servers 120 may comprise one or more primary processors (e.g., CPUs) not shown in FIG. 1, as well as a set of one or more other processors of one or more offload cards 126 (e.g., offload cards 126A of VS 120A, and offload cards 126B of VS 120B) in the depicted embodiment. The offload cards may be linked to the primary processors via peripheral interconnects such as PCIe (Peripheral Components Interconnect-Express) in some embodiments. In effect, each virtualization server 120 may actually comprise a distributed system in the depicted embodiment, with different parts of the server's functionality being implemented at the primary processors and the respective sets of offload processors (processors located on the offload cards). A collection of software and firmware, referred to collectively as partially-offloaded virtualization management components (PVMCs) 124, such as PVMCs 124A at VS 120A, and PVMCs 124B at VS 120B, may perform virtualization management tasks for the compute instances run at the VSs. Such tasks may, for example include acting as intermediaries between virtualized devices (e.g., virtual CPUs, devices for performing networking operations, storage operations, and the like) used by the compute instances, and the underlying physical or hardware devices. As discussed below in the context of FIG. 4, the PVMCs may include a stripped down version of a hypervisor, running on the primary processors, as well as virtualization management components run on the offload cards 126 in various embodiments.

In the embodiment depicted in FIG. 1, the offload cards 126 may also include a respective set of migration manager components 128 (e.g., migration manager components 128A and 128B at VSs 120A and 120B) comprising some combination of firmware, software and/or hardware. In some implementations, some of the functions of the migration managers may be performed by virtualization management components; thus, in effect, migration-related responsibilities may be added to the virtualization-related responsibilities of the PVMCs. A migration manager may include a respective migration coordinator 129 and a respective migration accelerator 130 in the depicted embodiment.

In at least some embodiments, when a decision to migrate a compute instance is reached at the VCS control plane resources 160, an indication of the decision may be provided to the migration coordinator 129 of the source VS—e.g., migration coordinator 129A of VS 120A in the case of compute instance 122A. Metadata which can be used to establish a secure network channel to be used for migration-related traffic may be provided by the VCS control plane to the migration coordinator 129 of the source VS in various embodiments. Such metadata may include, for example, a network address assigned to the migration accelerator 130B at the destination VS, details of the network protocol and/or security protocol to be used, one or more security artifacts (such as digital certificates, cryptographic keys etc.) and so on. Using the provided metadata, a point-to-point network channel 166 may be set up at the initiative of the migration coordinators 129A and 129B, to be used exclusively for migration-related network packets (in both directions) between migration accelerators 130A and 130B in the depicted embodiment. In some embodiments, two separate network channels may be set up, one for either direction.

A multi-stage migration workflow may be initiated by the migration coordinator 129A of the source VS 120A in the depicted embodiment, e.g., working collaboratively with migration coordinator 129B. In a pre-pause stage of the workflow, some state information of the pre-migration compute instance 122A may be transmitted to the destination VS 120B in various embodiments, while the compute instance 122A continues to run at the source VS 120A. Memory contents may be transferred in units of pages (e.g., 8 KB pages, 4 KB pages, etc.) in various embodiments from the source VS to the destination VS; the page sizes may vary in different embodiments. In some embodiments, multiple network pathways/channels may be used for the transfer of state information from source VS 120A to destination VS 120B, and the point-to-point network channel may not necessarily be used in all the stages of the migration workflow. An iterative approach may be used to transfer state information in the pre-pause stage in some embodiments, with newly-updated state information being sent in at least some iterations. Because the compute instance continues to run, a page of memory containing state information which was transmitted to the destination VS 120B in one iteration may be overwritten at the source VS before a subsequent iteration, so contents of the same page may in effect be transferred twice (or multiple times) to the destination VS in some cases. The pre-pause stage may be ended, e.g. by the migration manager at the source VS, based on various criteria in different embodiments, as described below in further detail.

The pre-migration version of the CI 122A may then be paused, and a portion of its state information which (a) has not yet been sent to the destination VS 120B) and (b) is essential to allow the post-migration version of the CI 122B to be started up successfully, may be transferred while the compute instance remains paused and hence unavailable to process any operations in the depicted embodiment. Typically, the VCS may attempt to keep the duration of the pause stage as short as possible (e.g., in some implementations, a few milliseconds or a few tens of milliseconds). The duration of the pause stage may be kept low in various embodiments by, for example, transferring as much state information in advance as possible, and/or by designing compute instance so as to minimize the set of state information required to restart a paused compute instance. The pause stage may end, and a post-pause stage may begin, when the post-migration version 122B of the CI is launched at the destination VS, even though some state information has not yet been transferred to the destination VS. In some implementations, some state information which is not essential for starting up the compute instance at the destination may also be transferred in the pause stage.

A number of data structures may be set up to help manage the transfer of state information efficiently during the various stages of the migration in different embodiments. These may include, for example, dirty-page bit maps (DBMs) maintained at the source VS, indicating which remaining pages of state information have been written to but not yet transferred to the destination VS. At the destination VS, a present-pages bit map (PBM) may be constructed, e.g., using a representation of the DBM contents provided by the source VS migration manager components during or after the pause stage. The present-pages bit map may indicate (e.g., using a "1" as a bit value) which pages of state information are already present at the destination VS when the post-migration version 122B of the CI is started up, while the complement value ("0") may be used to indicate pages which are not yet present. In some implementations, the present-pages bit map may be implemented as an absent-pages bit map. Data structures other than bit maps may be used to convey the equivalent information in different embodiments.

In at least some embodiments, one or more flags may be used to indicate, to various components of the software/firmware stack being used for the compute instance 122B, that the post-pause stage of operations is underway. During this stage, when a memory access is requested to allow one or more operations to be performed on behalf of or by the compute instance, the component (e.g., a virtual CPU, an I/O (input/output) virtualization management component, etc.) responsible for the memory access may determine, based on the flag(s), that the PBM is to be consulted first. If the PBM indicates that the desired page is absent, a migration-related page fault may be generated, which results in a request for the missing page to be sent from the destination VS migration manager 128B to the source VS via the migration accelerator 130B and the channel 166, without using the destination VS's primary processors. At the source VS, the request for the missing page may be received by the migration accelerator 130A, and the requested page may be read in from the main memory by the migration manager 128A without utilizing the primary processors of the source VS. The contents of the page may be sent over channel 166 from the migration accelerator 130A to the migration accelerator 130B in various embodiments. At the destination VS, the contents of the page may be stored into main memory by the migration manager 128B, with minimal or no participation from the primary processors in some embodiments. As mentioned earlier, each of the VSs may be considered distributed systems, with multiple offload cards as well as primary CPUs being used together to implement VS functionality. Requests for memory pages which have not yet been transferred may originate at various devices/cards during the post-pause phase: thus, it may sometimes be the case that the same page is requested multiple times. In various embodiments, the migration accelerators may ensure that a given page is transferred at most once in the post-pause stage, even if it happens to be requested more than once. As discussed below, in some embodiments, a hybrid push-pull model may be used to transfer state information in the post-pause stage, in which the SVS migration manager 128A proactively sends memory pages (for which page faults requests have not been submitted from the DVS) to the DVS. In such embodiments, the DVS migration manager 128B may ensure that only the first transfer of a given page results in an update of the page in the main memory of the DVS; if the same page is transferred again, the DVS migration manager 128B may simply acknowledge the completion of the transfer, without re-updating the main memory of the DVS.

In addition to requesting pages when the state information is needed immediately, a pro-active approach may be implemented to try to transfer all the remaining state information as soon as possible in some embodiments. According to such embodiments, a sweeper component (e.g., part of the migration manager 128B) may issue fake or spurious page faults for pages that have not yet been transferred and that have not yet been requested. The pages requested by the sweeper may also be transferred in the manner described above, e.g., also using the channel 166, in various embodiments. As a result, all the state information of the compute instance may be transferred relatively quickly, and the migration procedure may be terminated.

Example Migration Timeline

Figure 2:
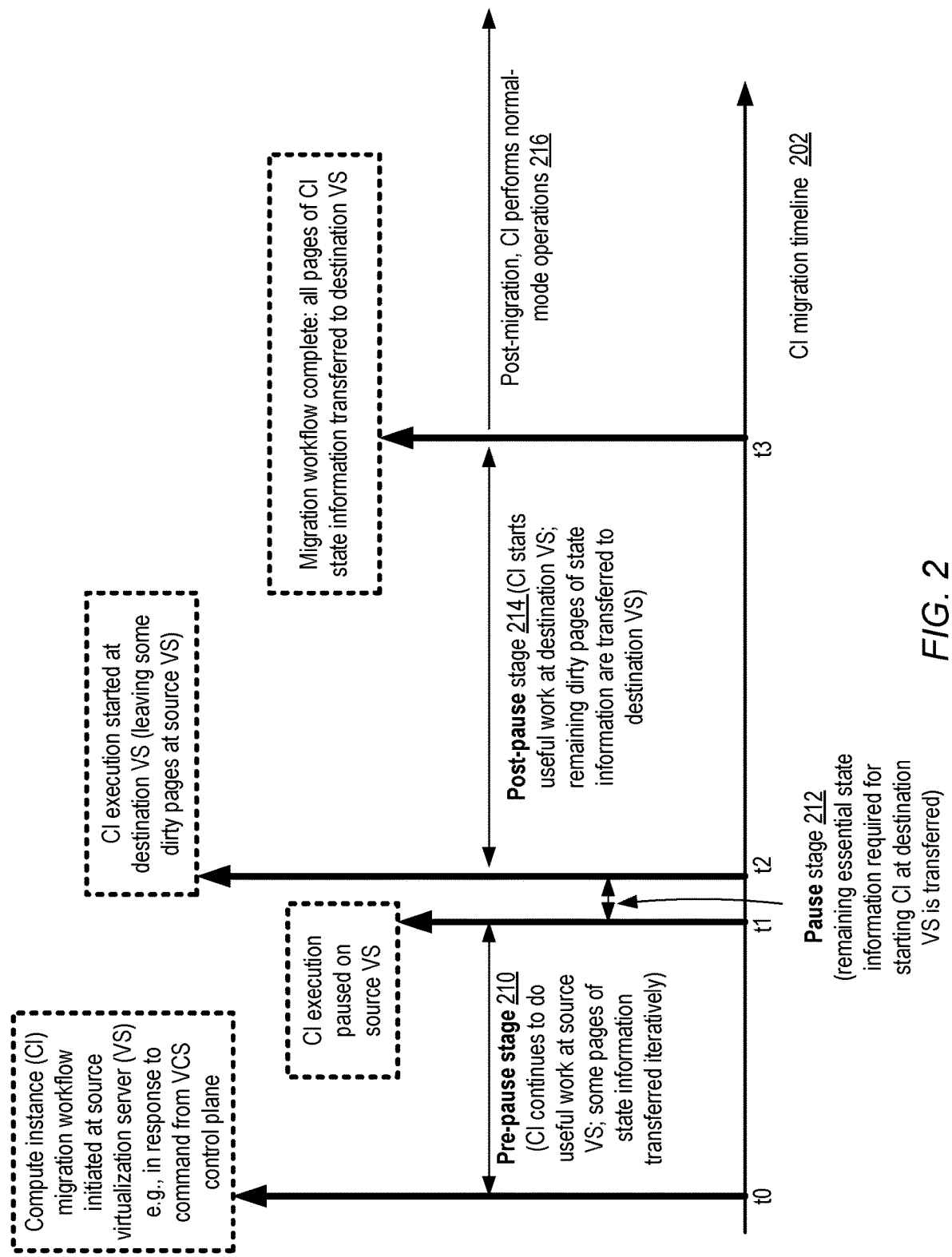
FIG. 2 illustrates an example timeline of events during an accelerated migration of a compute instance, according to at least some embodiments.

FIG. 2 illustrates an example timeline of events during an accelerated migration of a compute instance, according to at least some embodiments. In the depicted embodiment, the migration workflow for a compute instance (CI) is initiated at a source virtualization server at time t0 along timeline 202. The workflow may be initiated, for example, in response to a command from a VCS control plane by a migration manager running at one or more offload cards of the source virtualization server in at least some embodiments. As part of the initiation, the migration manager may, for example, set up one or more data structures such as a dirty-page bit map at the source VS, and cause a network channel to be set up between the source and destination servers' offload cards using metadata provided by the control plane.

The migration workflow may be divided into three stages or phases in the depicted embodiment: a pre-pause stage 210, a pause stage 212, and a post-pause stage 214, in each of which migration manager components at the offload cards of the source and destination may communicate with one another to accelerate the transfer of state information of the compute instance. In the pre-pause state 210, which lasts from t0 to t1 along the timeline, the CI continues to run and do useful work at the source VS, and the contents of some pages containing state information of the CI is transferred iteratively from the main memory of the source VS to the main memory of the destination VS by the migration manager components. In a given iteration, the set of memory pages which have been written to since the last iteration may be identified, for example, and at least some of the newly-written pages may be transferred to the destination VS. Note that although the CI continues to perform operations at the source VS during the pre-pause stage, some of the resources of the source VS are being used for the memory transfers, so the performance of applications running at the CI may be slightly degraded in at least some embodiments relative to their performance before the migration workflow started.

The pre-pause stage 210 is terminated at time t1 in the depicted embodiment, when the CI is paused, e.g., by stopping one or more virtual CPUs and devices assigned to the CI. The pre-pause stage may be ended, for example, when the source VS's migration manager determines that the rate at which the CI's state information is being written/ updated at the source VS has reached a steady state (or that it shows no signs of ever reaching a steady state), so there would not necessarily be any benefit to continuing with further iterations in one embodiment. In another embodiment, the VCS control plane may send an indication of a maximum permitted duration of the pre-pause stage to the migration manager at the source VS, and the pre-pause stage may be ended when the specified amount of time has elapsed. In the pause stage 212, the migration manager at the source VS may determine the minimum amount of additional state information which is required to allow the CI to be started up at the destination VS, and transfer this minimal set of state information to the destination VS. During the pause stage 212, the applications which were running on the CI are unable to perform any operations, so the pause stage is typically kept as short as possible.

As soon as sufficient state information (including state information of the virtual CPUs and devices of the CI) has been obtained at the destination VS and a set of data structures (e.g., a present-pages bit map indicating which pages of the CI's state information are already present at the destination VS), the pause stage 212 may be ended and the post-pause stage 214 may begin in the depicted embodiment. On the example timeline 202, the pause stage is ended at time t2, when the CI is started up at the destination VS even though some state information it may need has not yet been transferred from the source VS. In the post-pause stage, which lasts from t2 to t3, the CI starts doing useful work again, and the remaining dirty pages of state information are transferred to the destination VS. A page fault protocol may be used for the transfers in at least one implementation, in which at least some of the dirty pages are fetched as and when they required to perform operations of the CI. During the post-pause stage, at least some memory accesses may require the checking of the present-pages data structure, leading to some overhead; as such, the performance of the applications running at the CI may again be slightly worse than the performance achieved before or after the migration workflow in the depicted embodiment. In some embodiments, the network channel set up between the migration accelerators at the source and destination virtualization servers may be used primarily or entirely in the post-pause stage to speed up the process of transferring the remaining state information; in other embodiments, the network channel may also or instead be used in the other two stages.

At time t3 along the timeline 202, all the pages containing the CI's state information have reached the destination VS, and the migration workflow is complete. Post-migration, the CI performs its normal operations 216 without any migration-related overhead in the depicted embodiment. By using the offload cards-based migration manager components and the dedicated network channel, the total time taken for the migration workflow may be reduced relative to other approaches, and the impact of the migration on other compute instances which may happen to be running at the source or destination VSs may be reduced as well.

Figure 3:
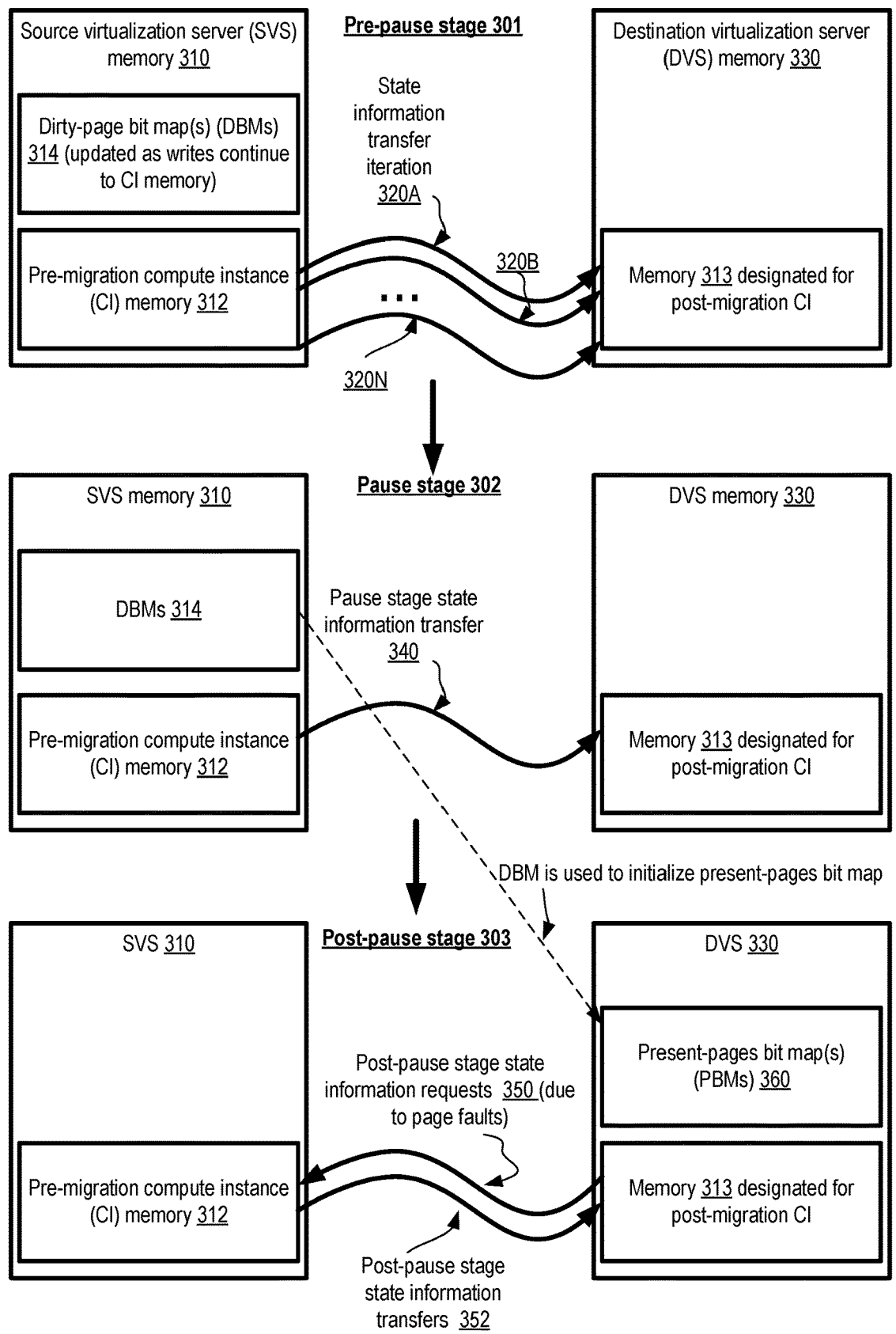
FIG. 3 illustrates example transfers of state information and associated data structures used during respective stages of a multi-stage compute instance migration workflow, according to at least some embodiments.

FIG. 3 illustrates example transfers of state information and associated data structures used during respective stages of a multi-stage compute instance migration workflow, according to at least some embodiments. In the pre-pause stage 301, state information of the to-be-migrated compute instance may be transferred from pre-migration CI memory 312 (allocated to the compute instance) in multiple iterations 320, such as 320A-320N to memory 313 designated for the post-migration compute instance. The source virtualization server (SVS) memory 310 may be used to store one or more dirty-page bit maps (DBMs) 314 in the depicted embodiment, with respective entries set to "1" (representing "dirty") when corresponding pages of CI memory 312 are written/ updated on behalf of the compute instance, and entries set to "0" (representing "clean") to indicate that the contents of the corresponding pages have been transferred to the destination virtualization server (DVS) memory. The mappings between bit values and "dirty"/"clean" status may differ in some implementations: e.g., "1" may be used to represent "clean" and "0" may be used to represent "dirty" in some cases. Because the compute instance continues to run at the SVS in this stage, and its state information may change as the transfer iterations 320 are performed, a given page may be marked dirty, transferred to the DVS and then again marked dirty, potentially repeatedly. Memory pages which have been written to by all DMA-capable devices and virtual CPUs may be tracked using the DBMs 314 in various embodiments. DBMs may be implemented in a variety of ways in some embodiments: e.g., a DBM per device, a single DBM for multiple devices, one or more DBMs per pre-pause phase iteration, and so on. In at least one embodiment, DBMs may be created or deleted dynamically, with new DBMs being created when devices are attached, and existing DBMs being discarded when devices are detached. When a new device is being added/attached to the compute instance in the pre-pause stage, dirty page tracking data structures for the device may have to be established by the device emulation model before the device is made visible/accessible to the instance. (A similar dynamic approach may be used for present-pages bit maps at the DVS as indicated below.) The migration manager at the SVS may examine the contents of the various DBMs, and transfer the dirty pages indicated by the DBMs, with minimal overhead on the primary processors being used by the compute instance at the source VS.

Data structures other than bit maps may be used in some embodiments to keep track of changes to pre-migration CI memory 312. For example, a dirty log, comprising start and end addresses of regions which have been written to, may be used in one embodiment. Different data structures and formats may be used for indicating dirty memory based on a variety of factors in some embodiments, e.g., based on the compactness of the data structures, the efficiency with which the data structures can be accessed, anticipated patterns in which memory is updated, and/or on the performance capacities of the offload cards being used. In one embodiment, the DBMs 314 or logically equivalent data structures may be stored at the offload cards instead of in main memory of the SVS. In some embodiments, the migration manager running at the offload cards of the SVS may allocate memory (e.g., in the SVS main memory, and/or at the offload cards) for the DBMs (as well as the present-page bit map used in the post-pause stage) in response to receiving an indication from the VCS control plane that the compute instance is to be migrated. In the depicted embodiment, the iterations 320 of state information transfer may be initiated by the migration manager at the SVS. In other embodiments, a migration manager running at the DVS may initiate the iterations 320, e.g., by sending requests for newly-updated state information.

The pre-pause stage may be terminated, and the CI may be paused, after the transfer iterations reach convergence in some embodiments—e.g., if the migration manager(s) are able to detect that the rate at which state information is being updated at the SVS has reached a plateau. In at least one embodiment, a time budget may be assigned for the pre-pause stage, e.g., by the VCS control plane and/or a migration manager, and the pre-pause stage may be ended when the budget is exhausted. Other factors may be used to terminate the pre-pause stage in some embodiments.

The to-be-migrated CI may be paused, starting the pause stage 302 after the pre-pause stage ends in the depicted embodiment. A set of additional state information, required to start up the CI at the DVS may be sent (e.g., in a transfer 340) from the SVS to the DVS. Such essential state information may include, for example, at least some elements of virtual CPU state, device state associated with various I/O devices, and so on in different implementations. In addition, in at least some embodiments, contents of the DBM(s) 314 may be used to set up a present-pages bit map (PBM) 360 at the DVS, indicating the set of pages of memory 312 that are present in post-migration memory 313 at the DVS 330 (and thus also indicating the pages which are yet to be transferred). In one embodiment, for example, a list of the still-dirty pages may be sent by the SVS migration manager to the DVS migration manager to help initialize the present-pages bit map(s) 360.

After the PBM has been initialized and the minimum set of state information needed to start the CI at the DVS has been transferred, the CI may be started up at the DVS in the depicted embodiment, even though some state information is yet to be transferred from the SVS. In the depicted embodiment, a page fault protocol may be implemented collectively by migration manager components at the offload cards of the SVS and the DVS to obtain the state information at the DVS. When a new device is being added/attached to the compute instance at the DVS in the post-pause stage, present-page tracking data structures for the device may have to be established by the device emulation model before the device is made visible/accessible to the instance, in a manner analogous to the way that dirty-page tracking data structures have to be established for new devices in the pre-pause stage as described above. As and when a memory page which is not yet transferred is required, a corresponding state information request 350 may be sent by the DVS migration manager to the SVS migration manager, e.g., without utilizing the primary CPUs of the DVS in at least some embodiments. The SVS migration manager may fetch the requested page from the memory 312, e.g., without using the primary CPUs of the SVS, and transfer the page to the DVS over the point-to-point network channel set up by the migration manager earlier (transfer 352). In some embodiments, the point-to-point network channel may be set up the control plane of the VCS, without requiring the virtualization servers themselves to participate actively in the establishment of the channels; such an approach may help enhance the overall security of the system. At the DVS, the requested page may be written to the memory 313, and the PBM 360 may be updated to indicate that the page is now present at the DVS. The component at the DVS (e.g., a virtual CPU, or an I/O operation virtualization management component) which requested the page may be informed that the page has reached the DVS using a variety of techniques in different embodiments. For example, in one embodiment, the component may periodically examine a page fault completion queue, and detect when an entry for the requested page is placed in the completion queue. In another embodiment, an interrupt mechanism may be used to notify the waiting components when a requested page arrives at the DVS. In some embodiments, a sweeper process running at the DVS (e.g., at the offload cards) may generate spurious page faults for pages that have not yet been requested for the CI, thus speeding up the transfer of the remaining state information.

Example Virtualization Server Components

Figure 4:
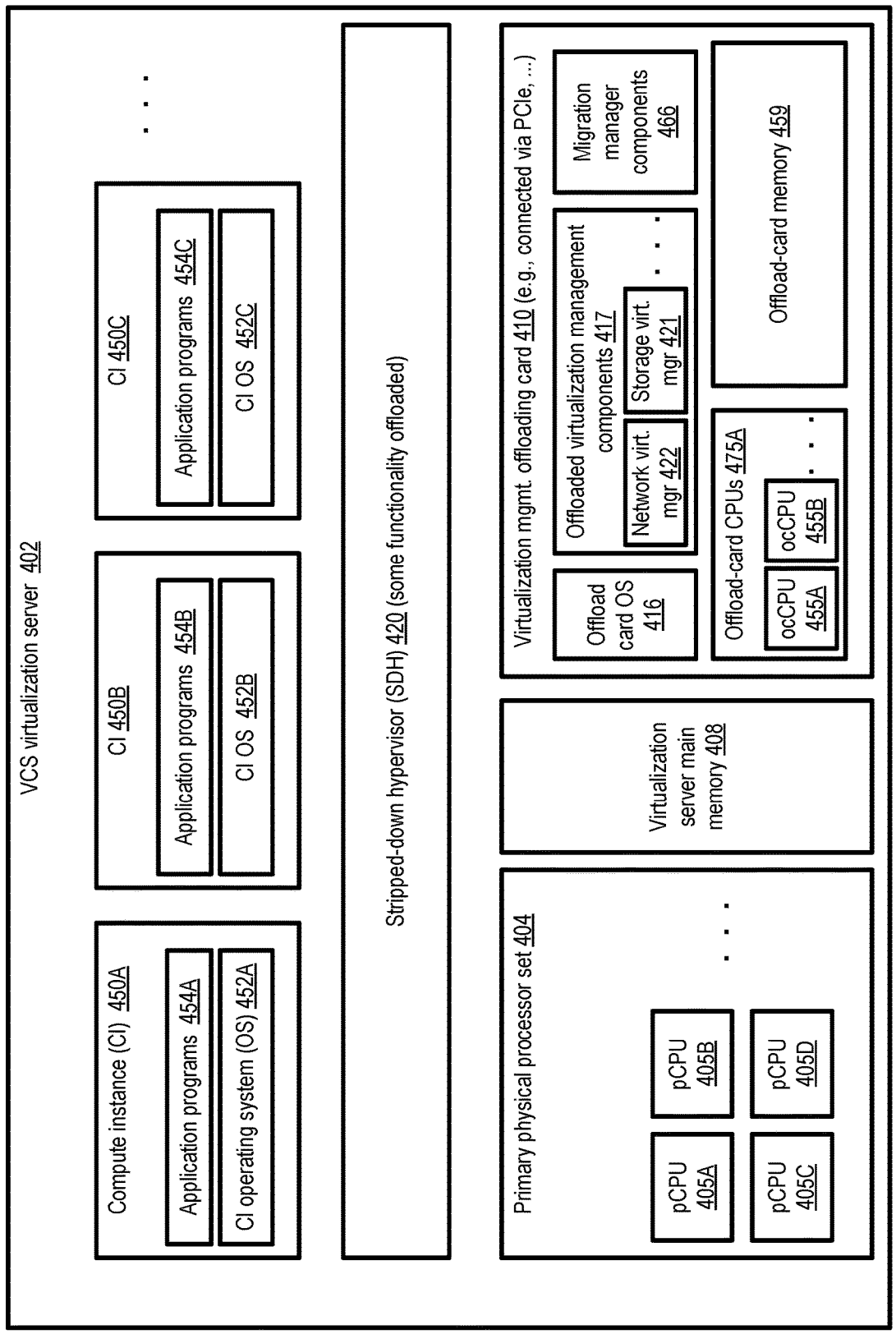
FIG. 4 illustrates example components of a virtualization server at which one or more virtualization management offload cards are used to accelerate compute instance migration, according to at least some embodiments.

FIG. 4 illustrates example components of a virtualization server at which one or more virtualization management offload cards are used to accelerate compute instance migration, according to at least some embodiments. As shown, VCS virtualization server 402 comprises a set of primary physical processors 404, including primary CPUs (pCPUs) 405A, 405B, 405C and 405D as well as a main memory 408 in the depicted embodiment. The primary physical processor set 404 and the main memory 408 may be used by a stripped-down hypervisor (SDH) 420, as well as various compute instances (CIs) 450 (e.g., 450A, 450B, or 450C) set up on behalf of clients of the VCS at the virtualization server. Individual ones of the CIs 450 may be allocated one or more virtual CPUs in the depicted embodiment, e.g., by the virtualization management components running at the server 402, with each virtual CPU representing a virtualized version of a pCPU. The hypervisor 420 may be referred to as being "stripped-down" because a portion of its functions may be offloaded to programs running at a virtualization management offloading card 410 in the depicted embodiment. As a result of such offloading, a larger fraction of the computing power of the primary physical processor set 404 may become available for compute instances 450 in the depicted embodiment than in some other approaches towards virtualization, in effect reducing the overhead of virtualization management imposed on the resources that could be used on behalf of clients of the VCS. In at least some embodiments, using offloading card resources may be more cost-efficient as well, as some functions that would otherwise have to be performed using more expensive pCPUs may instead be performed (with little or no degradation in performance) using cheaper offloading card processors. In some embodiments, the SDH may participate in the migration workflow for compute instances 450, e.g., along with the migration manager components running at offload cards. Individual CIs 450 may comprise a respective group of one or more application programs 454 (e.g., 454A-454C) and an operating system 452 (e.g., 452A-452C) in the depicted embodiment.

In some embodiments, offload card 410 may be connected via a peripheral interconnect to the primary processor set 404 of the virtualization server. For example, in some implementations, PCIe may be used, while in other implementations USB or other types of interconnects may be used. The offloading card 410 may include a set of local offload-card CPUs 475 (referred to as ocCPUs), such as ocCPU 455A and 455B in the depicted embodiment, as well as offload-card memory 459. The program instructions executed to implement an offload card operating system 416, a set of offloaded virtualization management components 417, and/or one or more migration manager components 466 may be stored in the memory 459. The offloaded virtualization management components may include, for example, a network virtualization manager 422, and/or a storage virtualization manager 421 in the depicted embodiment. Various aspects of network traffic management (including, for example, the implementation of encapsulation protocols used for sending traffic associated with virtual network addresses over the underlying or substrate network of the VCS) may be handled by network virtualization manager 422 in the depicted embodiment. The storage virtualization manager 421 may enable the compute instances to access one or more virtualized storage volumes and/or other types of storage devices (e.g., local storage devices, and/or remote network-accessed storage devices) in at least some embodiments. Memory may be accessed on behalf of a given compute instance 450 at least by the virtual CPUs assigned to the compute instance, by the network virtualization manager 422, and/or by the storage virtualization manager 421.

The migration manager components 466 may implement the compute instance migration acceleration techniques, involving the use of a dedicated network channel for migration-related traffic described above. In at least some embodiments, a VCS virtualization server 402 may comprise multiple offloading cards 410, with virtualization management components 417 and/or migration manager components distributed across the different cards. Individual ones of the offload cards may comprise one or more systems-on-chip (SOCs) in at least one embodiment. In some embodiments, the offload cards may also comprise other elements not shown in FIG. 4, such as trusted platform modules (TPMs), power management components, and the like.

Example Interactions During Post-Pause Stage of Migration

Figure 5:
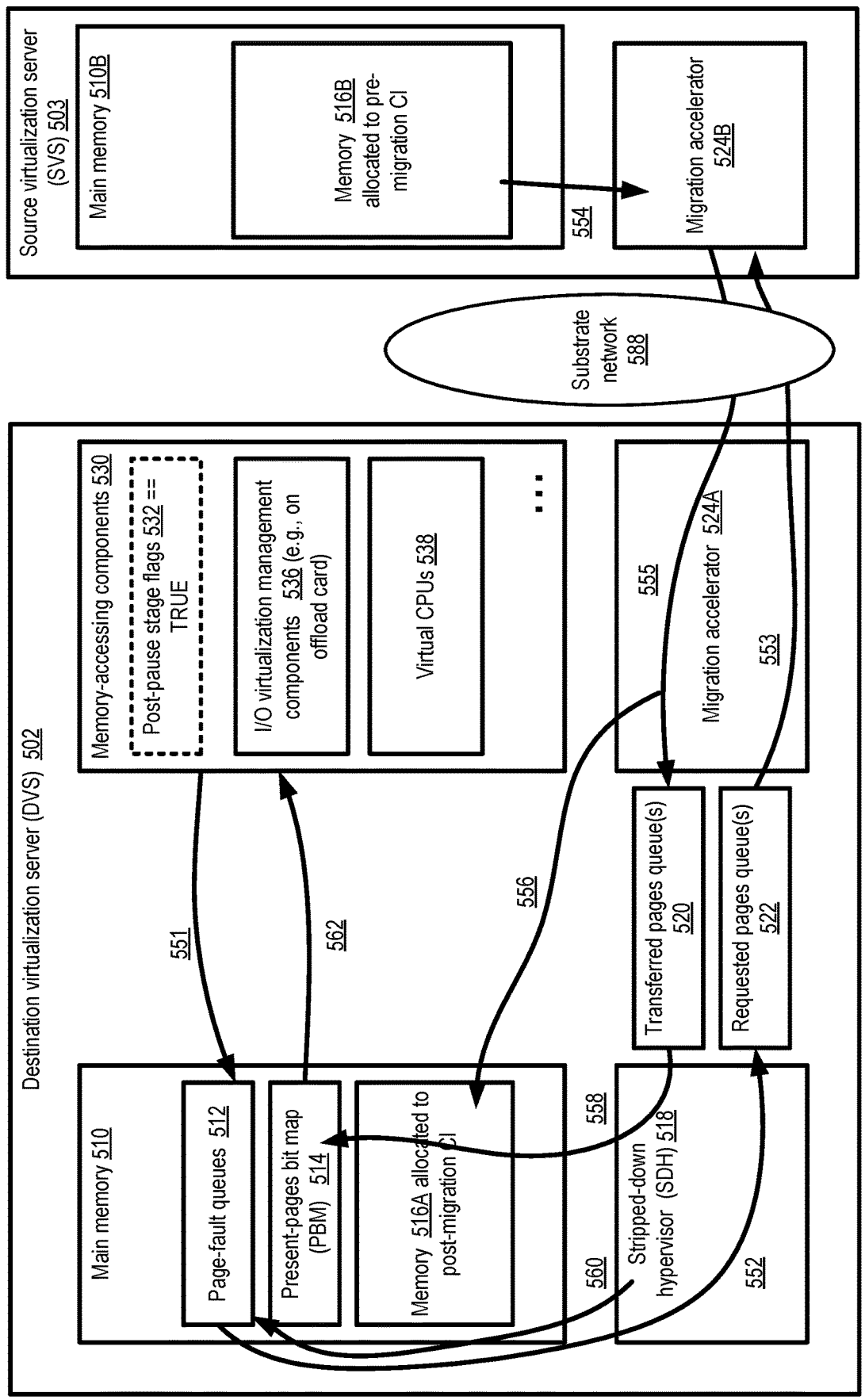
FIG. 5 illustrates example communications between components participating in a post-pause stage of a compute instance migration, according to at least some embodiments.

FIG. 5 illustrates example communications between components participating in a post-pause stage of a compute instance migration, according to at least some embodiments. In the depicted embodiment, one or more flags 532 may be used to indicate that the post-pause stage is underway to memory-accessing components 530 running at the destination virtualization server 502 of a compute instance migration. When flags 532 are set to indicate that the post-pause stage is in progress, the memory-accessing components 530 may have to perform some additional work than when the flags 532 indicate that the post-pause stage is over; as such, the memory-accessing components 530 may be said to run in a somewhat less-performant post-pause mode during the post-pause stage. Before doing a DMA (direct memory access) on behalf of the compute instance for a particular page of state information which is needed to perform one or more operations of the compute instance, for example, I/O virtualization management components 536 (which may run on one or more offload cards) and or virtual CPUs 538 may check a present-pages bit-map 514 (as indicated by arrow 562) to determine whether the page is already at the DVS 502. If the page is not present, an entry identifying the needed page may be stored into a page-fault queue 512, as indicated by arrow 441.

In the embodiment depicted in FIG. 5, the stripped-down hypervisor (SDH) 518 at the DVS may be informed when the page fault request is entered into the queue 512, e.g., as a result of an interrupt raised by the memory-accessing component 530. The SDH 518 may in turn insert a corresponding entry into a requested pages queue 522 accessible from the migration accelerator 524A of the DVS 502, as indicated by arrow 552. In at least some embodiments, the SDH 518 may be responsible for de-duplicating page fault requests generated by the memory-accessing components before inserting corresponding entries into the requested pages queue 522. In one implementation, the SDH 518 may generate an identifier token (also referred to as a cookie) for each page fault request, and the entry inserted into the requested pages queue may include the memory address of the page as well as the token. A given entry in the requested pages queue, which may be stored at an offload card in some embodiments, may thus represent an indication or message, originating at a memory-accessing component such as an I/O virtualization manager, that the page identified in the entry is not yet present at the DVS 502 and is required for the compute instance.

The DVS migration accelerator 524A (which may, for example, be implemented using firmware running at the offload cards) may send the entry in the requested pages queue 522 in a message to the SVS migration accelerator 524B via the physical or substrate network of the VCS in the depicted embodiment, as indicated by arrow 553. The message may be transmitted, for example, using a raw IP segment or packet sent over a dedicated network path set up for instance migration-related traffic between the SVS and the DVS offload cards.

The SVS migration accelerator 524B may use the memory address information contained in the entry to copy the contents of the requested page from memory 516B (allocated to the pre-migration compute instance) into a response message at the offload cards of the SVS, as indicated by arrow 554. The identifier token which was included in the message sent by the accelerator 524A may also be included in the response message 555 sent by accelerator 524B back to the accelerator 524A in the depicted embodiment. The DVS migration accelerator 524A may cause the contents of the page to be written into memory 516 allocated to the post-migration CI (arrow 556), e.g., without utilizing the primary CPUs of the DVS in the depicted embodiment. In addition, an entry containing the token may be placed into a transferred pages queue 520 in the depicted embodiment by the migration accelerator 524A in at least some embodiments. The SDH 518 may update the PBM 514 to indicate that the pages has been transferred successfully to the memory 516 (arrow 558) and also modify the page-fault queue 512 (arrow 560) to indicate that a response to the page fault has been received from the SVS. Some or all memory accessing components 530 may block on the response to the page fault request (entered into a queue 512) in some embodiments. In other embodiments, some or all memory accessing components 530 may instead poll the bit corresponding to the missing page in the PBM 514, and may determine that the page has been obtained when the bit is updated by the SDH 518.

In some embodiments, the SDH 518 may also comprise a sweeper thread or process which submits page fault requests for pages that have not yet been requested on behalf of the migrated CI, e.g., to ensure that all the contents of memory 516B are copied to memory 516A as quickly as possible. The sweeper may, for example, examine the contents of virtual CPU stacks to determine additional pages to request from the SVS. A migration coordinator running on the DVS offload cards (similar in functionality to migration coordinator 129B of FIG. 1) may communicate with the sweeper to determine when the post-pause stage can be concluded. In some embodiments, the migration coordinator may poll the sweeper, while in other embodiments the sweeper may send a message or notification to the migration coordinator indicating that there are no more pages to be brought over to the DVS. The flags 532 may be reset (e.g., changed from TRUE to FALSE) to indicate that the post-pause stage and the migration workflow as a whole are complete, that is, that all the state information of the compute instance has been transferred. After the flags are reset, the memory-accessing components may resume normal mode operation in various embodiments; as such, the PBM may not have to be checked any longer. The memory 516B which had been used by the pre-migration CI may be freed, the dedicated network channel may be closed, and the memory being used for the PBM may be released in the depicted embodiment after the post-pause stage is complete.

In some implementations, at least some of the functions described as being performed by the SDH 518 in FIG. 5 (including the functions of the sweeper) may instead be performed by a migration manager component running at the offload cards of the DVS. In at least one implementation, at least a portion of the page fault queues 512 and/or the PBM 514 may be stored on the offload cards instead of in the DVS main memory 510.

Methods for Accelerated Migration of Compute Instances

Figure 6:
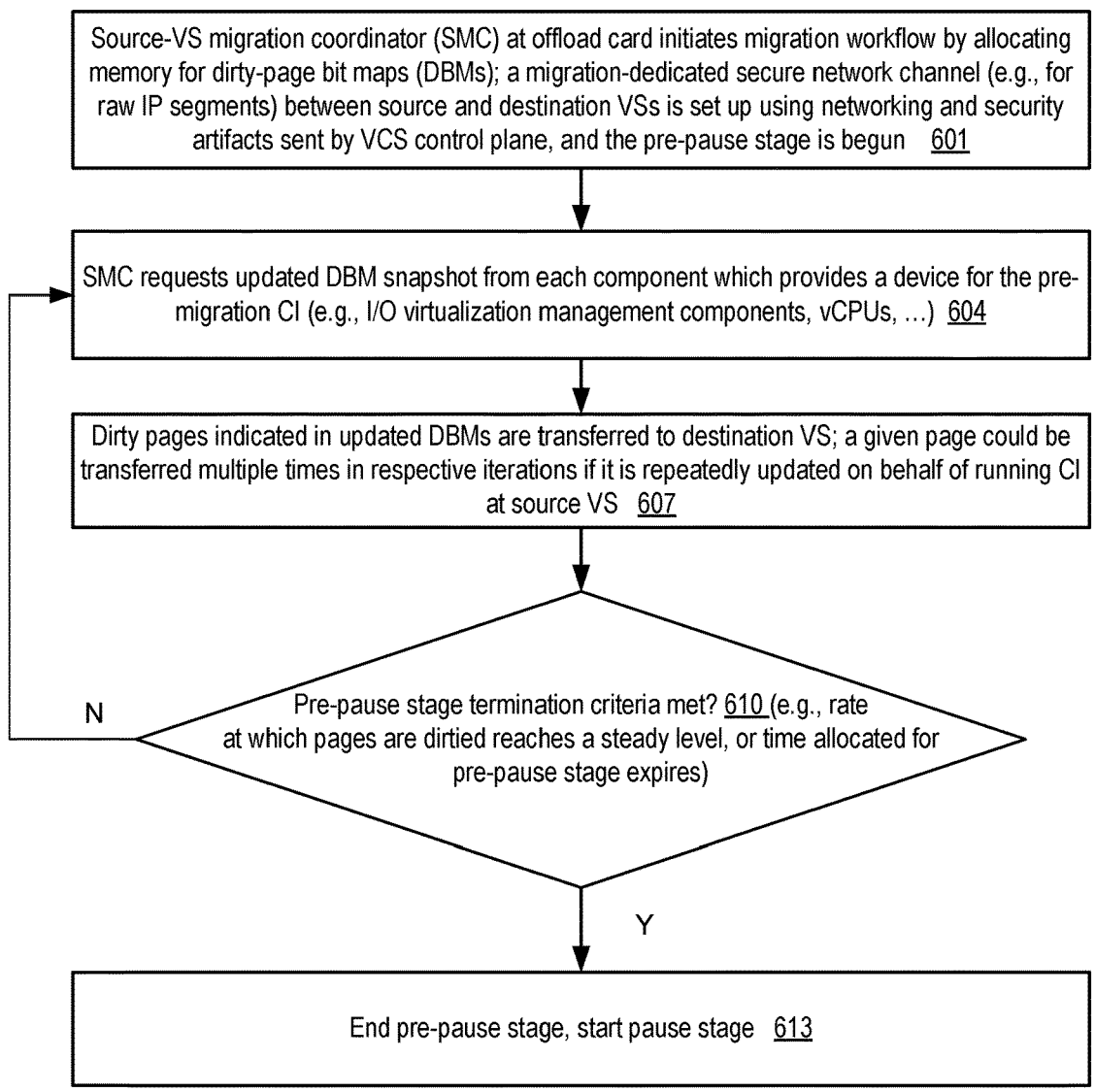
FIG. 6 is a flow diagram illustrating aspects of operations that may be performed during a pre-pause stage of a compute instance migration, according to at least some embodiments.

FIG. 6 is a flow diagram illustrating aspects of operations that may be performed during a pre-pause stage of a compute instance migration, according to at least some embodiments. As shown in element 601, a migration coordinator (SMC) (similar in functionality to migration coordinator 129B of FIG. 1) at an offload card of a source virtualization server (SVS) may initiate the multi-stage migration workflow, with the pre-pause stage as the first stage. The migration coordinator may allocate memory for one or more dirty-page bit maps (DBMs) at the SVS, and set up a migration-dedicated secure point-to-point network channel (e.g., usable to send and receive raw IP segments) between the offload cards at the SVS and the DVS in at least some embodiments. In some embodiments, the SMC may communicate with the destination virtualization server's migration controller to cause memory for the present-pages bit map to be allocated at the destination virtualization server. The migration workflow may be initiated, for example, in response to a command received from the VCS control plane. In some embodiments, one or more artifacts such as the substrate address of the DVS offload cards, digital certificates, cryptographic keys or the like may be sent by the control plane to the migration coordinator, and such artifacts may be used to set up the secure network channel.

An iterative technique may be employed to transfer state information to the destination VS in the depicted embodiment. For a given iteration of state information transfer, the SMC may request updated DBM snapshots from various components which provide a device for the pre-migration CI (e.g., I/O virtualization management components running at the offload cards, virtual CPUs, etc.) (element 604). At least a subset of the dirty pages indicated in the DBMs (pages whose most-recently-written contents have not yet been sent to the DVS) may be transferred to the DVS (element 607) in various embodiments in any given iteration. A given page may be transferred multiple times, e.g., once in each of several different iterations if it happens to be updated repeatedly on behalf of the running CI at the SVS. In some embodiments, the dedicated network channel may be employed for the pre-pause stage transfers of state information.

A migration manager component at the SVS may check whether pre-pause stage termination criteria are met (element 610). For example, the criteria may be met of the rate at which pages are being written to or "dirtied" reaches a steady level, or of the time allocated (e.g., by the control plane) for the pre-pause stage has expired. If the criteria are satisfied, the pre-pause stage may be ended and the pause stage may be started (element 613) in various embodiments. If the pre-pause stage termination criteria are not met, as also detected in operations corresponding to element 610, a new state information transfer iteration may be initiated, and operations corresponding to elements 604, 607 and 610 may be conducted for the new iteration.

Figure 7:
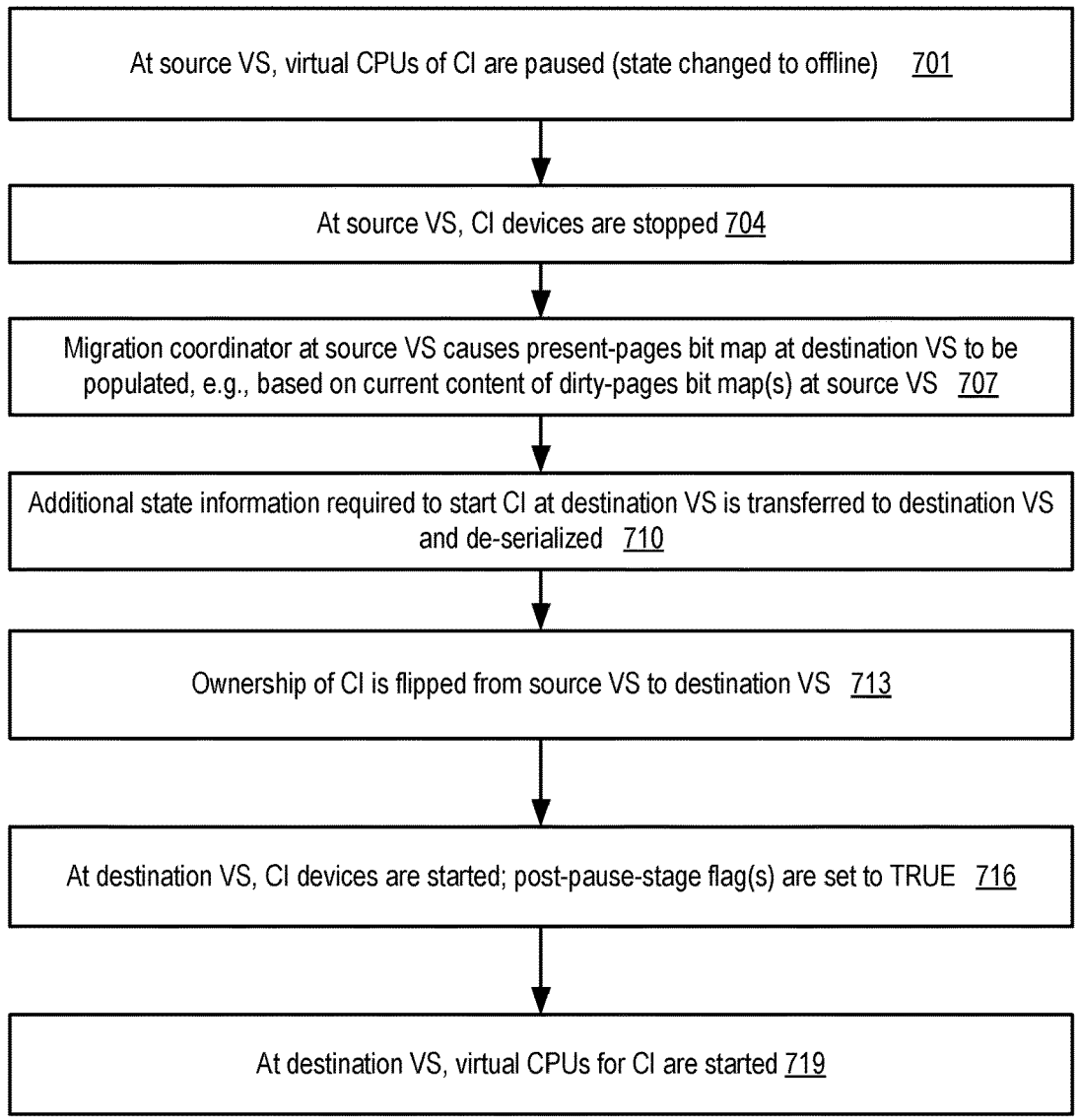
FIG. 7 is a flow diagram illustrating aspects of operations that may be performed during a pause stage of a compute instance migration, according to at least some embodiments.

FIG. 7 is a flow diagram illustrating aspects of operations that may be performed during a pause stage of a compute instance migration, according to at least some embodiments. One or more virtual CPUs which were assigned to the compute instance at the source virtualization server may be paused and placed in an offline state, as shown in element 701, e.g., as a result of one or more requests or commands from the migration coordinator to the stripped-down hypervisor running at the source virtualization server. In addition, the devices accessible to the compute instance (e.g., implemented with the help of the virtualization management components running at the offload cards and the operating system of the compute instance) may be stopped (element 704).

The migration coordinator of the source virtualization server may cause a present-pages bit map (PBM) to be initialized or populated for the compute instance at the destination virtualization server (element 707), e.g., based on the current contents of one or more dirty-page bit maps which were used during the pre-pause stage at the source virtualization server. In effect, a list of the pages of state information that remain dirty (i.e., pages that have not yet been transferred after being modified at the source virtualization server) may be sent to the destination virtualization server's migration manager components in various embodiments. In some embodiments, pages which are not yet present at the destination virtualization server may be unmapped from the virtual CPUs of the compute instance.

Additional state information required to start the compute instance at the destination virtualization server may be serialized at the source virtualization server, transferred to the destination virtualization server and de-serialized in the depicted embodiment (element 710). Metadata indicating ownership of the compute instance (e.g., stored at the virtualization management components of the source and destination virtualization servers, and/or at the VCS control plane) may be flipped to indicate that the destination virtualization server is the owner, and the source virtualization server is no longer the owner (element 713) in various embodiments.

At the destination virtualization server, the devices may be started up for the compute instance and the post-pause-stage flag(s) may be set (e.g., to TRUE or 1) to indicate that the present-pages bit map are to be consulted when a memory page is to be accessed via DMA (element 716). The virtual CPUs for the compute instance may be started up (brought into online state) at the destination virtualization server to initiate the post-pause stage in the depicted embodiment. The compute instance may utilize the primary CPUs of the destination virtualization server, e.g., to implement one or more applications which were earlier run using the resources of the source virtualization server.

Figure 8:
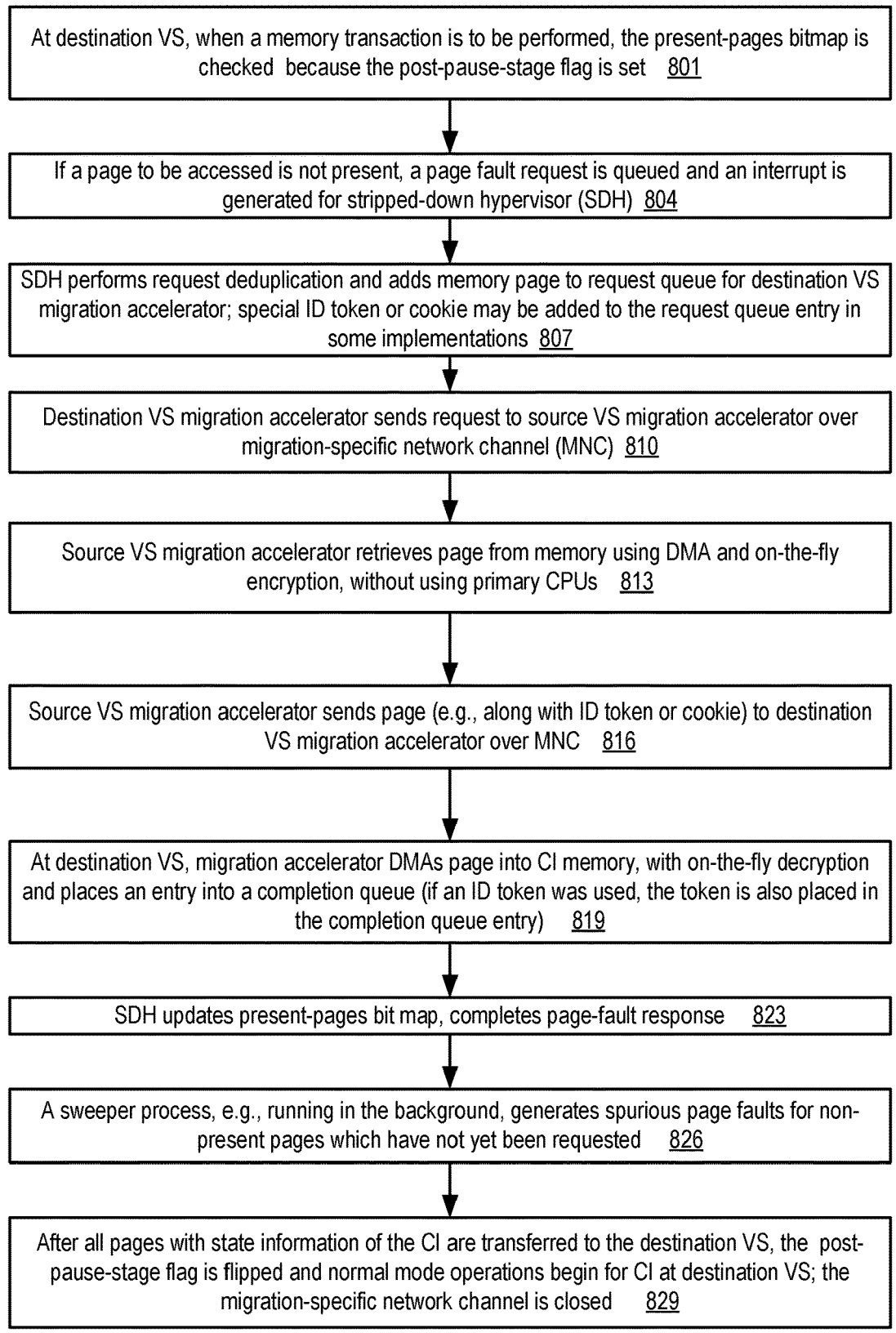
FIG. 8 is a flow diagram illustrating aspects of operations that may be performed during a post-pause stage of a compute instance migration, according to at least some embodiments.

FIG. 8 is a flow diagram illustrating aspects of operations that may be performed during a post-pause stage of a compute instance migration, according to at least some embodiments. Because of the setting of the post-pause state flag(s), the present-pages bit map is checked when a memory transaction (e.g., for a DMA operation on behalf of the migrated version of the compute instance) is to be performed (element 801). If the bit-map indicates that a needed page is not present, a page fault request may be generated and stored (e.g., in a queue data structure stored in the destination virtualization server's main memory or offload cards) in at least some embodiments (element 804). An interrupt may be generated for the stripped-down hypervisor (SDH) of the destination virtualization server by the component responsible for accessing the page (e.g. an I/O virtualization management component or a virtual CPU) in the depicted embodiment.

The SDH may perform request deduplication (e.g., to avoid requesting the same page multiple times from the source virtualization server) and add an entry indicating the page to a request queue for the destination virtualization server's migration accelerator in the depicted embodiment (element 807). In at least some implementations, a special identifier token or cookie may be generated and added to the entry inserted into the request queue, which may be used for matching responses received from the source virtualization server to corresponding requests.

The migration accelerator of the destination virtualization server may send a packet containing the request entry to the source virtualization server's migration accelerator over the network channel dedicated to migration-related traffic which was established earlier in various embodiments (element 810). In some implementations, multiple queued requests may be included in a single packet sent over the channel. In at least one embodiment, the network channel may be employed in a multi-tenant manner if needed—e.g., memory requests on behalf of multiple compute instances being migrated from the same source virtualization server to the same destination virtualization server may be sent using the channel, and corresponding page contents may be received over the channel as well.

At the source virtualization server, the migration accelerator may receive a request for a page and retrieve the requested page via DMA from the main memory, implementing on-the-fly encryption in the depicted embodiment (element 813). The primary CPUs or processors of the source virtualization server may not be used for this transfer or for the encryption-related computations in at least some embodiments. The source virtualization server's migration accelerator may then transfer the encrypted page contents to the destination virtualization server's migration accelerator (element 816). In embodiments in which the identifier token or cookie was sent with the request, the identifier token may also be included in the response.

In at least one embodiment, multiple levels of encryption may be implemented on-the-fly at the offload card(s) of the source virtualization server for the network messages or packets containing page contents being transferred, and corresponding levels of decryption may be performed at the offload card(s) of the destination virtualization server, or along the network path to the destination virtualization server. For example, in some embodiments in which IP-based packets are used for transferring page contents, the source virtualization server's offload card may encrypt (a) routing information pertaining to the destination virtualization server within a substrate network at a data center, (b) migration-specific routing information including compute instance metadata and a memory location in which contents of the page are to be placed, and/or (c) DMA-engine-specific information used to encrypt and decrypt the contents of the page, with different keys or security artifacts/materials being used for encrypting the different types of information. The routing-related information for a packet may be decrypted, e.g., by networking intermediary devices on the path between the source and destination virtualization servers, to determine the next destination(s) to which the packet should be transmitted. Migration-specific routing information may be used to distinguish packets being used for the migration of one compute instance (identified by its compute instance metadata) from the packets being used for the migration of another compute instance, and to ensure that only those migration accelerators which were intended to be used for a given compute instance are able to decrypt contents of packets being used for transferring that compute instance's state information. It may sometimes be the case that multiple compute instances are migrated concurrently between the same source and destination servers, and the migration-specific routing information may also be used to ensure that the packets being used for the different instances are distinguished from one another. The page contents being sent from the source to the destination virtualization servers may also be encrypted using artifacts specific to the DMA engines being used, to ensure that the content of a page is only readable (e.g., in plain text) when placed in the correct memory locations by the DMA engine (at both the source and destination). In some implementations in which such multi-level encryption/decryption is performed, respective packet headers may be used for the different levels of encryption.

The migration accelerator at the destination virtualization server may receive the packet containing the requested page, and DMA the contents of the page into the memory designated for the compute instance in the depicted embodiment (element 819). The page may be decrypted on the fly by the accelerator in at least some embodiments, without using compute cycles of the primary CPUs of the destination virtualization server. An entry may be placed into a page-fault completion queue in various embodiments, along with the identifier token. In some embodiments, the SDH may be responsible for updating the present-pages bit map to indicate the presence of the requested page in the compute instance's memory, thereby completing the page fault response (element 823).

In some embodiments, a sweeper process or thread (e.g., part of the SDH or the migration manager) may generate spurious page faults at the destination virtualization server for pages that are not yet present and have not yet been requested on behalf of the compute instance (element 826). These spurious page faults may be handled in the same way as the other (non-spurious) page faults described above. The sweeper may in effect run as a background task, such that it does not interfere with the processing of non-spurious page faults in some implementations.

After all the pages containing state information of the compute instance have been transferred to the destination virtualization server, as determined for example by the sweeper process and communicated to the migration coordinator, the post-pause stage flag may be reset or flipped in various embodiments. Normal mode operations (in which memory operations do not require checking the present-pages bit map) may then be begun for the compute instance (element 829), and the migration-specific network channel may be closed in at least some embodiments.

The operations described as being performed by the SDHs of the source and/or destination virtualization servers in the various stages of the migration procedure may, in some implementations, be performed at least in part by migration manager components running on the offloading cards. Similarly, data structures such as the dirty-page bit maps and/or the present-pages bit maps may be stored either in the main memories of the virtualization servers or in memory located on the offload cards. In some embodiments, the dedicated network channels set up for migration may be used in all stages of the migration workflow; in other embodiments, the channels may not be used in some of the stages. It is noted that in various embodiments, some of the operations shown in the flow diagrams of FIG. 6, FIG. 7, or FIG. 8 may be implemented in a different order than that shown in the figure, or may be performed in parallel rather than sequentially. Additionally, some of the operations shown in FIG. 6, FIG. 7 or FIG. 8 may not be required in one or more implementations.

Figure 9:
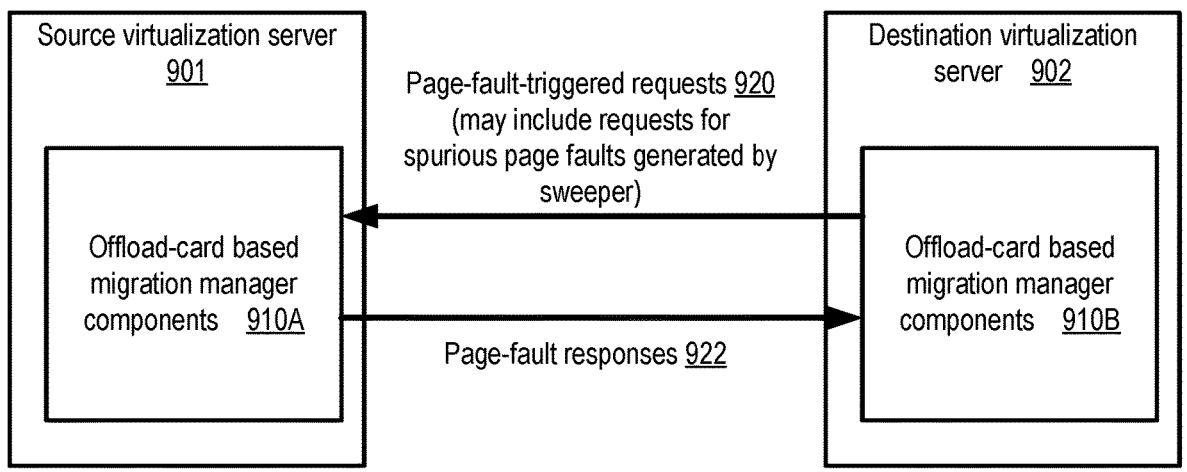
FIG. 9 illustrates alternative modes for transferring memory contents during post-pause stages of compute instance migrations, according to at least some embodiments.
Figure 9:
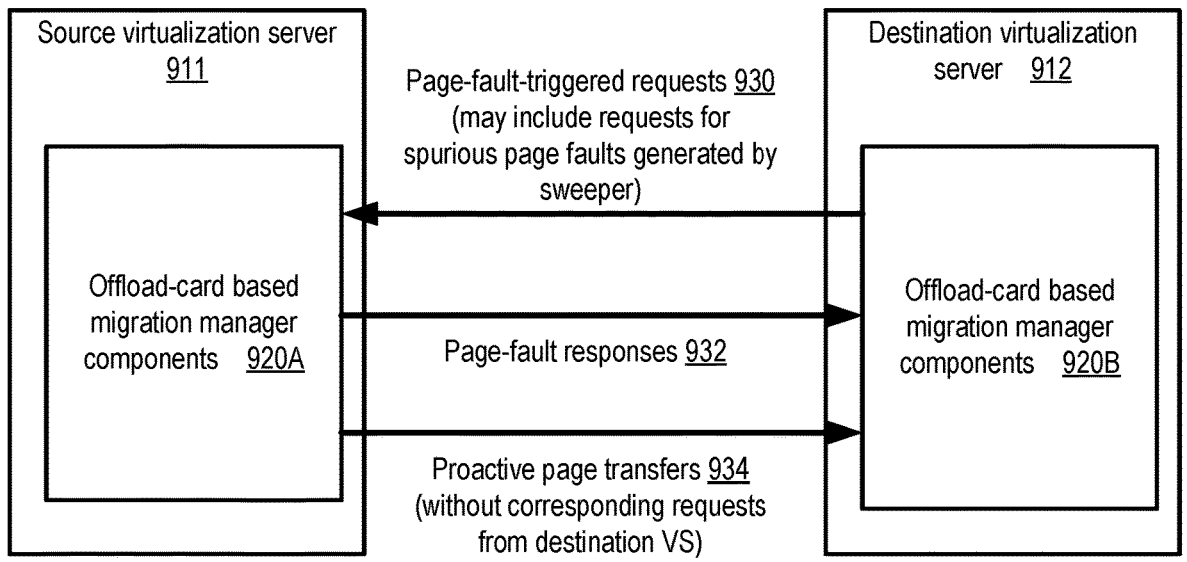

FIG. 9 illustrates alternative modes for transferring memory contents during post-pause stages of compute instance migrations, according to at least some embodiments. In some embodiments, memory contents may be transferred only when requested from the destination virtualization server. This approach may be referred to as pull-mode-only transfers 950A, as the destination side "pulls" state information from the source side. The offload-card based migration manager components 910B of the destination virtualization server 902 may send requests 920, which have been triggered by page faults, over the special network channel dedicated to migration-related traffic. The offload-card based migration manager components 910A of the source virtualization server 901 may send memory page contents only in page-fault responses 922 to such requests in the depicted embodiment during the post-pause stages. As discussed above, multiple types of page faults may be generated at the destination virtualization server 902— "real" page faults generated when a memory page has to be retrieved for a compute instance to continue performing its operations, and "spurious" page faults generated by a sweeper process for pages which may be required by the compute instance in the future but are not required immediately.

In a different approach referred to as pull-and-push mode 950B, at least some memory pages may be "pushed" or sent proactively (in transfers 934) by the offload-card based migration manager components 920A of a source virtualization server 911 to the offload-card based migration manager components 920B of the destination virtualization server 912, without receiving a corresponding request. In addition, the page-faults-triggered requests (930) and responses (932) may also be used for transferring state information in the push-and-pull mode in various embodiments. At the source virtualization server 911, the memory access patterns of the compute instance prior to migration may be analyzed, and used to prioritize the proactive transfers of some pages over others—e.g., pages which are expected to be accessed sooner may be transferred proactively earlier than pages expected to be accessed later. Because both the source and the destination may initiate the transfers, additional synchronization and de-duplication effort may be required in embodiments in which the pull-and-push mode is used than in embodiments in which only the pull mode is used. In at least one embodiment, a tunable parameter may be set (e.g., by the VCS control plane) to select which of the two modes is to be used for a given compute instance migration. The VCS control plane may, for example, select the mode to be used based on measurements of network traffic levels in the substrate network, CPU utilizations at the destination and source virtualization servers, or based on migration completion time constraints (which may differ from one compute instance category to another, or from one VCS client to another). In some embodiments, only one of the two modes shown in FIG. 9 may be supported.

Use Cases

The techniques described above, of utilizing offloading card resources and dedicated network channels to speed up the process of migrating compute instances may be beneficial in a variety of scenarios. More and more complex applications are being designed and implemented using compute instances of virtualized computing services. Such applications may often have very stringent performance and availability requirements. The virtualized computing service may have to migrate some compute instances from time to time, e.g., to physical servers with newer and more performance hardware, or to allow maintenance operations to be performed. In some cases, the clients on whose behalf the compute instances are set up may themselves request compute instance migrations, e.g., to move a set of collaborating or cooperating compute instances onto hardware servers that are closer to one another (physically and/or in terms of network hops). Reducing the time taken for migrating the compute instance may be essential to the performance objectives of the clients, and the proposed techniques may help to enable such reductions.

Illustrative Computer System

Figure 10:
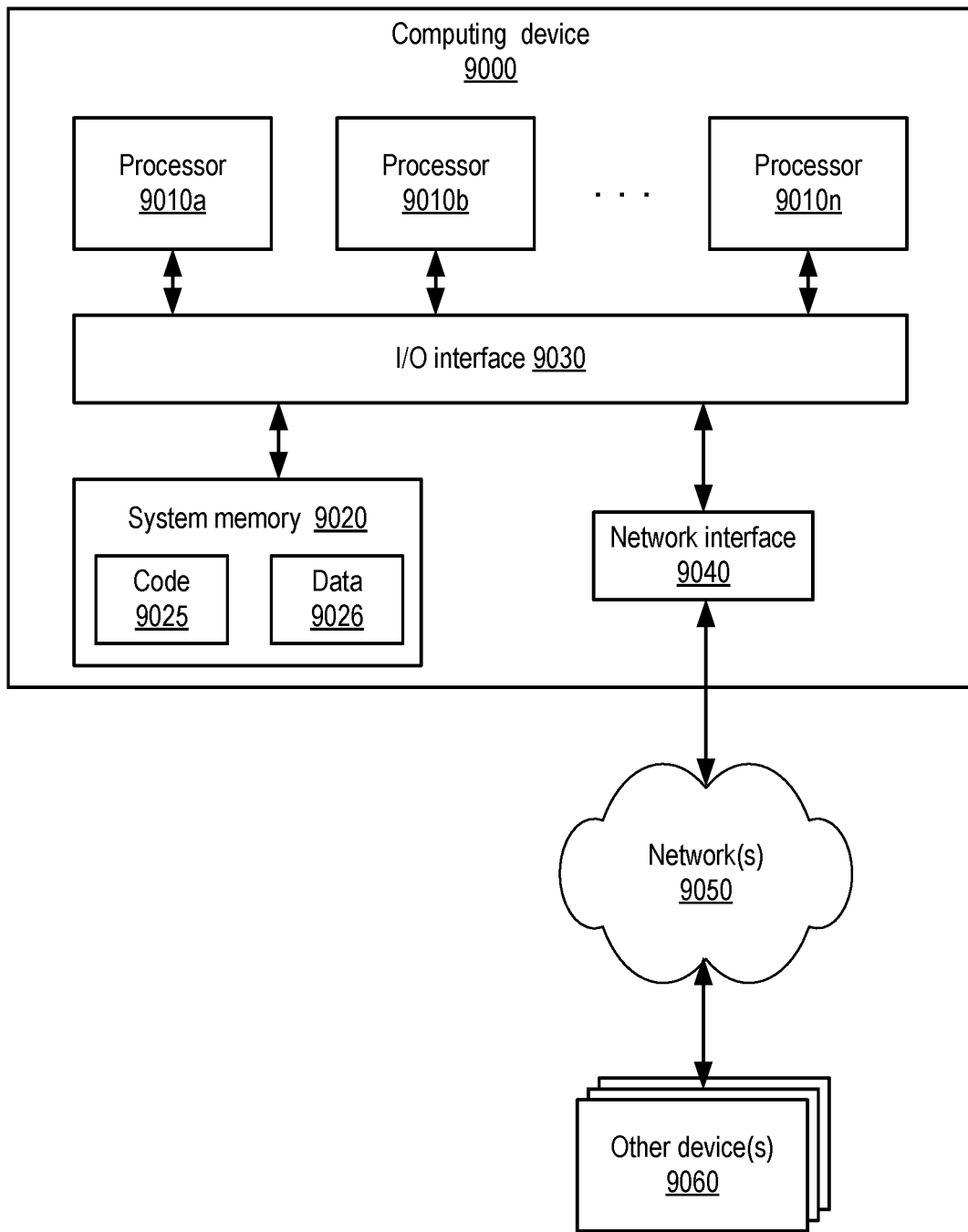
FIG. 10 is a block diagram illustrating an example computing device that may be used in at least some embodiments.

In at least some embodiments, a server that implements one or more of the control-plane and data-plane components of a virtualized computing service, including virtualization servers at which offloading cards are used to accelerate compute instance migrations, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and/or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
obtaining an indication, at a first instance migration manager running at a first set of one or more offload processors of a first virtualization server, from a control plane of a virtualized computing service, that a compute instance of the first virtualization server is to be migrated to a second virtualization server, wherein the first virtualization server includes a first primary processor at which at least a subset of computations of the compute instance are performed, and wherein the second virtualization server comprises a second primary processor and a second set of one or more offload processors; and
establishing, by the first instance migration manager, using metadata provided by the control plane, a secure network channel dedicated for transferring at least some migration-related packets between the first and second sets of one or more offload processors;
causing to be transferred, by the first instance migration manager in a pre-pause stage of a multi-stage workflow for migration of the compute instance, contents of a first collection of pages containing state information of the compute instance from the first main memory to the second main memory while the compute instance remains running at the first virtualization server;
causing to be transferred, by the first instance migration manager in a pause stage of the multi-stage workflow, contents of a second collection of pages containing state information of the compute instance from the first main memory to the second main memory while execution of the compute instance is paused;
causing to be stored, by a second instance migration manager component running at the second set of one or more offload cards of the second virtualization server, indications of memory pages whose contents have been transferred to the second main memory from the first main memory in a present-pages data structure at the second virtualization server;
causing execution of the compute instance, using the second set of one or more primary processors, to be started at the second virtualization server before contents of at least some pages containing state information of the compute instance have been transferred to the second main memory; and
in response to a determination, made using the present-pages data structure in a post-pause stage of the multi-stage workflow, that contents of a particular page comprising state information required to perform one or more operations at the second virtualization server on behalf of the compute instance have not been transferred to the second virtualization server,
causing, by the second instance migration manager, a transmission of the contents of the particular page to the second migration manager via the secure network channel, without utilizing the first set of one or more primary processors, and without utilizing the second set of one or more primary processors; and
causing the contents of the particular page to be stored into the second main memory.

2. The method as recited in claim 1, wherein the metadata provided by the control plane comprises one or more of: (a) a digital certificate, (b) an indication of a networking protocol to be used for the secure network channel, or (c) a network address assigned to the second virtualization server.

3. The method as recited in claim 1, wherein the secure network channel enables transmission of raw Internet Protocol (IP) frames.

4. The method as recited in claim 1, wherein said causing the transmission of the contents of the particular page to the second migration manager via the secure network channel comprises:
sending a page fault request via the secure network channel, wherein the page fault request comprises (a) a unique identifier of the page fault request and (b) an identifier of the particular page;
wherein the contents of the particular page are transferred to the second virtualization server from the first virtualization server via a message which contains the unique identifier.

5. The method as recited in claim 1, wherein the secure network connection is used to at least one page of one or more of: (a) the first collection of pages or (b) the second collection of pages.

6. A system, comprising:
a first virtualization server, comprising a first primary processor and a set of one or more offload cards at which a first migration manager is implemented; and
a second virtualization server, comprising a second primary processor and a second set of one or more offload cards at which a second migration manager is implemented;
wherein the first migration manager is configured to:
participate in the establishment of a network channel between the first and second sets of one or more offload cards, wherein the network channel is to be used at least for transferring packets associated with a migration of a compute instance from the first virtualization server to the second virtualization server; and
wherein the second migration manager is configured to:
cause to be stored, in a present-pages data structure at the second virtualization server, indications of memory pages whose contents have been transferred to the second virtualization server from the first virtualization server during one or more stages of a multi-stage migration of the compute instance;
in response to a determination, made using the present-pages data structure, that contents of a particular page comprising state information required to perform one or more operations at the second virtualization server on behalf of the compute instance have not been transferred to the second virtualization server after the compute instance has been started at the second virtualization server, cause a transmission of the contents of the particular page to the second migration manager via the network channel; and
cause the contents of the particular page to be stored into the second main memory.

7. The system as recited in claim 6, wherein the first migration manager is further configured to:
receive a message via the network channel from the second migration manager indicating the particular page; and cause contents of the particular page to be transferred from a main memory of the first virtualization server to the first set of offload cards prior to transmission of the contents to be transferred to the second virtualization server.

8. The system as recited in claim 6, wherein the first migration manager is further configured to:
encrypt, without utilizing the primary processor of the first virtualization server, at least a portion of a message comprising contents of the particular page prior to transmission of the contents to the second virtualization server.

9. The system as recited in claim 8, wherein to encrypt at least the portion of the message, the first migration manager performs encryption, using respective sets of one or more security artifacts, of (a) routing information pertaining to the second virtualization server within a substrate network of a data center, (b) migration-specific routing information including compute instance metadata and a memory location in which contents of the particular page are to be placed, and (c) DMA-engine-specific information used to encrypt and decrypt the contents of the particular page.

10. The system as recited in claim 6, wherein the second virtualization server further comprises one or more input/output (I/O) virtualization management components implemented at the second set of one or more offload cards, wherein the one or more input/output (I/O) virtualization management components are configured to:
determine, based at least in part on flag indicating that a post-pause stage of migration of the compute instance is in progress, that the present-pages data structure is to be examined prior to performing the one or more operations, wherein the flag is reset after transfer of state information of the compute instance from the first virtualization server to the second virtualization server is complete.

11. The system as recited in claim 6, wherein the second virtualization server further comprises a sweeper configured to:
proactively examine contents of the present-pages data structure without receiving a request for state information of the compute instance; and
based at least in part of the examination of the present-pages data structure, send a request for transfer of contents of another page to the first virtualization server without a determination that the other page is required for an operation to be performed on behalf of the compute instance.

12. The system as recited in claim 6, wherein the second virtualization server further comprises a sweeper configured to:
obtain an indication, from the first virtualization server, of one or more anticipated memory accesses of the compute instance; and
cause, based at least in part on the one or more anticipated memory accesses, a transfer of contents of a first page from the first virtualization server to the second virtualization server to be prioritized over a transfer of contents of a second page from the first virtualization server to the second virtualization server.

13. The system as recited in claim 6, wherein the second migration manager is further configured to:
determine, based at least in part on a communication with a sweeper implemented at the second virtualization server, that transfer of state information of the compute instance from the first virtualization server to the second virtualization server is complete; and
in response to the determination that the transfer of state information is complete, cause the network channel to be closed.

14. The system as recited in claim 6, wherein the first migration manager is configured to:
proactively cause contents of another page of memory containing state information of the compute instance to be transferred from the first virtualization server to the second virtualization server after the compute instance has begun execution at the second virtualization server, without receiving a request for the other page from the second virtualization server.

15. The system as recited in claim 6, wherein the first set of one or more offload cards is linked to the primary processor via a peripheral interconnect.

16. One or more non-transitory computer-accessible storage media storing program instructions that when executed on or across one or more processors of one or more offload cards of a first virtualization server implement a migration manager configured to:
cause to be stored, in a present-pages data structure, indications of memory pages whose contents have been transferred to the first virtualization server during one or more stages of a multi-stage migration of a compute instance to the first virtualization server from a second virtualization server;
in response to a determination, made using the present-pages data structure after the compute instance has begun execution at the first virtualization server, that contents of a particular page comprising state information required to perform one or more operations at the first virtualization server on behalf of the compute instance have not been transferred to the first virtualization server, cause a transmission of the contents of the particular page to the migration manager via a network channel established between the one or more offload cards of the first virtualization server and one or more offload cards of the second virtualization server; and
cause the contents of the particular page to be stored into a main memory of the first virtualization server.

17. The one or more non-transitory computer-accessible storage media as recited in claim 16, wherein the contents of the particular page are transferred using one or more raw Internet Protocol (IP) segments.

18. The one or more non-transitory computer-accessible storage media as recited in claim 16, wherein the migration manager is further configured to:
decrypt the contents of the particular page prior to causing the contents to be stored into the main memory of the first virtualization server.

19. The one or more non-transitory computer-accessible storage media as recited in claim 16, wherein the migration manager is further configured to:
participate in one or more stages of a multi-stage migration of the compute instance from the first virtualization server to a third virtualization server, including a pre-pause stage in which the migration manager causes state information of the compute instance to be transferred to the third virtualization server while the compute instance runs at the first virtualization server.

20. The one or more non-transitory computer-accessible storage media as recited in claim 16, wherein the migration manager is further configured to:
receive an indication that the contents of the particular page have not yet been transferred, wherein the indication originates at a virtualization manager component running at the one or more offload cards of the first virtualization server.

\* \* \* \* \*